(12) United States Patent
Anderson

(10) Patent No.: US 8,222,582 B1
(45) Date of Patent: Jul. 17, 2012

(54) CELESTIAL NAVIGATION USING STELLAR NARROW-BAND EMISSION

(76) Inventor: Mark J. Anderson, Mechanicsville, VA (US)

( * ) Notice: Subject to any disclaimer, the term of this patent is extended or adjusted under 35 U.S.C. 154(b) by 480 days.

(21) Appl. No.: 12/584,591

(22) Filed: Aug. 31, 2009

Related U.S. Application Data

(60) Provisional application No. 61/195,385, filed on Sep. 30, 2008.

(51) Int. Cl.
| | |
|---|---|
| *G01C 21/02* | (2006.01) |
| *G01C 21/20* | (2006.01) |
| *F42B 15/01* | (2006.01) |
| *G01C 21/00* | (2006.01) |
| *F42B 15/00* | (2006.01) |

(52) U.S. Cl. ..... 244/3.18; 244/301; 244/3.15; 244/3.16; 701/400; 701/408; 701/513

(58) Field of Classification Search ................ 244/3.1, 244/3.11–3.19, 158.1, 164, 171; 89/1.11; 382/100, 103; 701/1, 3, 4, 13, 400, 408, 701/513

See application file for complete search history.

(56) References Cited

U.S. PATENT DOCUMENTS

| | | | | | |
|---|---|---|---|---|---|
| 2,961,191 | A | * | 11/1960 | Jasperson | 244/3.18 |
| 3,194,949 | A | * | 7/1965 | Jasperson | 701/513 |
| 3,301,508 | A | * | 1/1967 | Yamron | 244/3.18 |
| 3,312,423 | A | * | 4/1967 | Welch | 244/3.18 |
| 3,360,638 | A | * | 12/1967 | Lillestrand et al. | 701/513 |
| 3,439,427 | A | * | 4/1969 | Gow | 701/513 |
| 3,488,504 | A | * | 1/1970 | Lowen et al. | 244/3.18 |
| 3,491,228 | A | * | 1/1970 | Selvin | 244/3.16 |
| 3,499,156 | A | * | 3/1970 | Bushnell et al. | 244/3.17 |
| 3,571,567 | A | * | 3/1971 | Eckermann | 701/513 |
| 3,636,330 | A | * | 1/1972 | Holeman et al. | 701/513 |
| 3,731,544 | A | * | 5/1973 | Acker et al. | 244/3.18 |
| 3,769,710 | A | * | 11/1973 | Reister | 701/513 |
| 3,780,966 | A | * | 12/1973 | Newcomb et al. | 244/3.16 |
| 4,012,018 | A | * | 3/1977 | Lorell et al. | 701/13 |
| 4,104,722 | A | * | 8/1978 | Evans | 701/513 |
| 4,306,691 | A | * | 12/1981 | Boxenhorn et al. | 244/3.18 |

(Continued)

OTHER PUBLICATIONS

Anderson, M. J. "Narrow-Band Spectral Estimation for Non-Mitchell-Johnson Stars", (paper).

(Continued)

*Primary Examiner* — Bernarr Gregory
(74) *Attorney, Agent, or Firm* — Gerhard W. Thielman, Esq.

(57) ABSTRACT

A method is provided for characterizing luminous celestial objects (e.g., stars) in celestial navigation of a missile system. The method includes segmenting, assigning, measuring, computing, ratioing, producing, scaling, and determining operations. Segmenting includes subdividing wavelength range into discrete contiguous bins. Assigning arranges each bin into a plurality of color bands. Establishing sets a transmissivity to each bin of each color band. Computing calculates broad-based fluxes for a reference value as a reference flux. Ratioing computes a ratio between the target flux to the library flux as a color scale for each band. Squaring determines the library flux for each band as a library flux squared. Producing sums a spectral scale over the color bands, a second multiplication of the color scale and the library flux squared as a first sum product, and sums over all the bands the library flux squared as a second sum product and dividing the sum products. Scaling factors each measured intensity of the measured intensities as a scaled intensity by multiplying each target intensity by the spectral scale for each bin. Determining sums a scaled broad-band flux for each band over the bins, a third multiplication of the transmissivity and the scaled intensity.

4 Claims, 17 Drawing Sheets

U.S. PATENT DOCUMENTS

| | | | | |
|---|---|---|---|---|
| 4,617,634 | A | * | 10/1986 | Izumida et al. ............... 701/13 |
| 4,621,329 | A | * | 11/1986 | Jacob ........................... 701/513 |
| 4,680,718 | A | * | 7/1987 | Sasaki et al. .................. 701/513 |
| 4,740,680 | A | * | 4/1988 | Frisch ......................... 244/3.18 |
| 4,746,976 | A | * | 5/1988 | Kamel et al. ................. 701/513 |
| 4,913,549 | A | | 4/1990 | Fujita et al. |
| 5,022,608 | A | * | 6/1991 | Beam ......................... 244/3.18 |
| 5,035,381 | A | * | 7/1991 | Matthews .................... 244/164 |
| 5,107,434 | A | * | 4/1992 | Paluszek ....................... 701/13 |
| 5,109,346 | A | * | 4/1992 | Wertz ........................... 701/13 |
| 5,177,686 | A | * | 1/1993 | Boinghoff et al. ............ 701/513 |
| 5,204,818 | A | * | 4/1993 | Landecker et al. ........... 701/513 |
| 5,223,702 | A | * | 6/1993 | Conley ........................ 244/3.16 |
| 5,319,968 | A | * | 6/1994 | Billing-Ross et al. ....... 244/3.16 |
| 5,319,969 | A | * | 6/1994 | Billing-Ross et al. ....... 244/3.16 |
| 5,410,143 | A | * | 4/1995 | Jones ........................... 701/513 |
| 5,412,574 | A | * | 5/1995 | Bender et al. ................ 701/513 |
| 5,686,719 | A | * | 11/1997 | Elkin ........................... 244/3.16 |
| 5,745,869 | A | * | 4/1998 | van Bezooijen ............. 701/513 |
| 5,935,195 | A | * | 8/1999 | Quine ........................... 701/513 |
| 5,963,166 | A | * | 10/1999 | Kamel ........................... 701/513 |
| 6,012,000 | A | * | 1/2000 | Holmes et al. ................. 701/513 |
| 6,102,338 | A | * | 8/2000 | Yoshikawa et al. ........... 701/513 |
| 6,108,594 | A | * | 8/2000 | Didinsky et al. .............. 701/513 |
| 6,324,475 | B1 | * | 11/2001 | Potteck ........................ 701/513 |
| 6,330,988 | B1 | * | 12/2001 | Liu et al. ....................... 701/513 |
| 6,433,710 | B1 | | 8/2002 | Heavens et al. |
| 7,219,014 | B2 | * | 5/2007 | Needelman et al. .......... 701/513 |
| 7,228,231 | B2 | * | 6/2007 | Needelman et al. .......... 701/513 |
| 7,526,381 | B2 | * | 4/2009 | Twitchell, Jr. ................. 701/513 |
| 7,542,849 | B2 | * | 6/2009 | Twitchell, Jr. ................. 701/513 |
| 7,831,341 | B2 | * | 11/2010 | Sheikh ......................... 701/513 |
| 8,019,544 | B2 | * | 9/2011 | Needelman et al. .......... 701/513 |

OTHER PUBLICATIONS

AIAA Missile Science Conference, Monterey, California, Session 3 MS-3, Nov. 18, 2008.

\* cited by examiner

Table 1. Scales for HR #6396

| HR# mj | $\alpha_{mj}$ | $\beta_{mj}$ | $\gamma_{mj}$ | $S_{mj}$ |
|---|---|---|---|---|
| 1142 | 1.68 | 1.64 | 1.52 | 1.66 |
| 1145 | 2.88 | 2.83 | 2.63 | 2.86 |
| 1156 | 2.69 | 2.51 | 2.13 | 2.63 |
| 1350 | 5.14 | 4.72 | 4.14 | 5.00 |
| 5778 | 2.48 | 2.47 | 2.52 | 2.48 |
| 7358 | 6.30 | 6.35 | 6.30 | 6.31 |
| 7613 | 5.26 | 5.15 | 4.72 | 5.21 |
| 7852 | 2.18 | 2.20 | 2.13 | 2.18 |
| 8523 | 3.58 | 3.55 | 3.39 | 3.56 |
| 8762 | 1.55 | 1.53 | 1.38 | 1.54 |

Table 2. Scaling Error for HR# 6396

| HR #mj | $\varepsilon_{mj}^{SCALED}$ |
|---|---|
| 1142 | 14.8 |
| 1145 | 24.1 |
| 1156 | 23.1 |
| 1350 | 29.8 |
| 5778 | 22.1 |
| 7358 | 31.2 |
| 7613 | 30.0 |
| 7852 | 20.1 |
| 8523 | 26.7 |
| 8762 | 13.0 |

Table 3. Process Percent Error Validation ← 700

| Error Source | Average | Kalman | Best-Scaled |
|---|---|---|---|
| Algorithm (with problem Stars) | 9 | 6 | 3 |
| Expected Error | 2.7 | 1.3 | 1.3 |
| Algorithm (without problem stars) | 3.0 | 1.0 | 1.0 |

Table 4. Scaled Spectra Flux Error

1300 →

| $\Delta \hat{h}_{mj}$ |
|---|
| $\Delta \hat{h}_1 = 0.96$ |
| $\Delta \hat{h}_2 = 132.03$ |
| $\Delta \hat{h}_3 = 0.11$ |
| $\Delta \hat{h}_4 = 0.32$ |
| $\Delta \hat{h}_5 = 0.24$ |
| $\Delta \hat{h}_6 = 0.26$ |

1310 →

Table 5. Error Weight Example

| Wavelength bins $\lambda$ | $cw(\lambda,1)$ | $cw(\lambda,2)$ | $cw(\lambda,3)$ | $\varepsilon_1(\lambda)$ | $\varepsilon_2(\lambda)$ |
|---|---|---|---|---|---|
| $\lambda = [1,13]$ | 1 | 0 | 0 | 0 | 1.0 |
| $\lambda = [14,22]$ | $\frac{1}{\sqrt{2}}$ | $\frac{1}{\sqrt{2}}$ | 0 | 0.5 | 1.0 |
| $\lambda = [23,36]$ | 0 | 1 | 0 | 1 | 1 |
| $\lambda = [37,76]$ | 0 | 0 | 1 | 1 | 1 |

FIG. 13

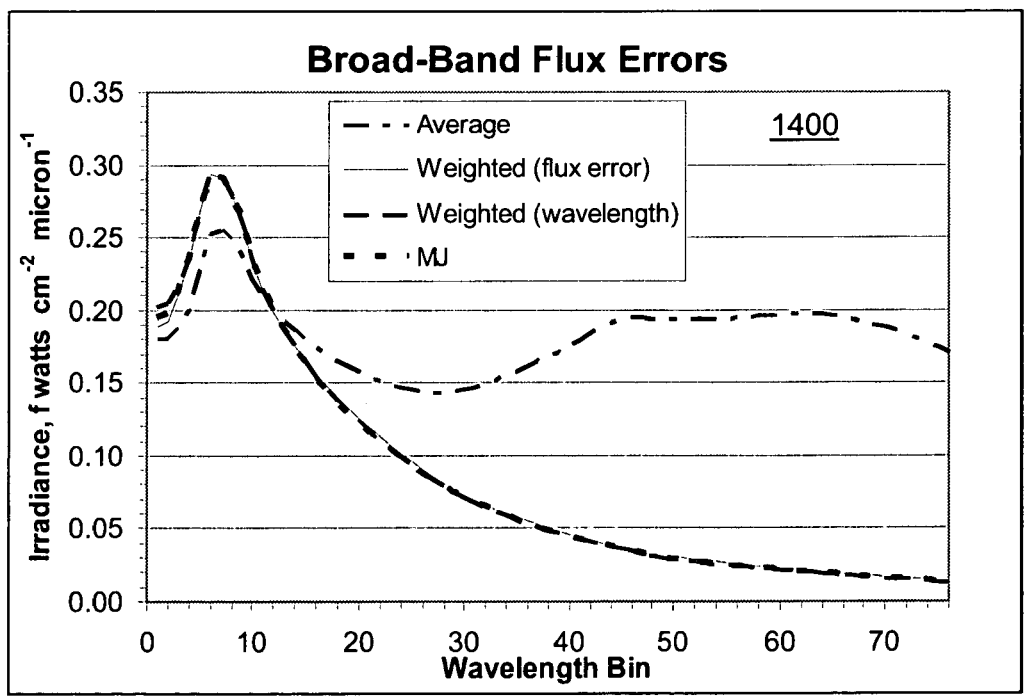

User Input
i. Array indices, unit definitions and user options   1510

| | |
|---|---|
| $mj_{max}$ | = number of similar spectra in set |
| $mj\_add$ | = number of á priori spectra in set |
| $k_{max}$ | = number of broad-band magnitude colors |
| $\lambda_{max}$ | = number of wavelength bins in spectra and transmission curves |
| $\Delta\lambda$ | = the width of each wavelength bin |
| $unit_0$ | = unit conversion for broad- band flux based on reference spectrum |
| $unit_{set}$ | = unit conversion for broad-band flux based on $h_{mj}(\lambda)$ |
| $unit_{est}$ | = unit conversion for broad-band flux based on scaled-spectra |
| weight_option | = option that defines the flux error to use in weighting estimation (1=average, 2=scaled-spectrum error, 3=wavelength dependent error based on color weights $cw(\lambda,k)$) | ii. Arrays of user supplied photometry data   1520

| | |
|---|---|
| $colormag(k)$ | = array of color magnitudes for target star |
| $color0(k)$ | = $cw(\lambda,k)$ color magnitude for reference star |
| $color(\lambda,k)$ | = two dimensional array containing color transmission curves |
| $h_{mj}(\lambda)$ | = two dimensional array of the library of user supplied spectra |
| $spectral\_type_{mj}$ | = one dimension string array containing the spectral type for $h_{mj}(\lambda)$ |
| $cw(\lambda,k)$ | = two dimensional array of weights for color flux error definition |
| $ap\_err_{mj}(\lambda)$ | = two dimensional array of á priori spectra errors |
| $h_0(\lambda)$ | = array containing the reference spectrum (usually Alpha Lyrae) |

Algorithm Output

| | |
|---|---|
| $\hat{h}_{mj}$ | = two dimensional array of scaled estimates of the target spectrum |
| $\Delta\hat{h}_{mj}$ | = two dimensional array of the flux error for the scaled estimates |
| $\varepsilon_{mj}(\lambda)$ | = two dimensional array of flux error used in weighted estimate |
| $ls\_min\_id$ | = the array index for $\hat{h}_{mj}$ that has the smallest array value in $\Delta\hat{h}_{mj}$ |
| $spectral\_type\_id$ | = character string containing the best guess of spectral type |
| $\hat{h}_W(\lambda)$ | = one dimensional array of the target star's estimated Kalman (or weighted" narrow-band spectrum |
| $\varepsilon_W(\lambda)$ | = one dimensional array estimated error in $\hat{h}_W(\lambda)$    1530 |
| error_kalman | = scalar value of the Kalman estimated error in $\hat{h}_W(\lambda)$ |

Do $k=1, k_{max}$ $$I_0(k) = units_0 \sum_{\lambda=1}^{\lambda max} color(\lambda,k)h_0(\lambda)\Delta\lambda \quad (32)$$

$$I_T(k) = I_0(k)10^{0.4(color0(k)-colormag(k))} \quad (33)$$

End do

FIG. 16A

Do $mj=1$, $mj_{max}$        1610 i. Compute the color broad-band flux and color scales for each spectrum in the library of narrow-band spectra. The value $units_{mj}$ ensures the units of the broad-band flux $I_{mj}(k)$ matches $I_T(k)$. The scale $\alpha(k)$ is a simple ratio of $I_T(k)$ with $I_{mj}(k)$.

1512
$$\begin{cases} \text{Do } k=1, k_{max} \\ I_{mj}(k) = units_{mj} \sum_{\lambda=1}^{\lambda max} color(\lambda,k) h_{mj}(\lambda) \Delta\lambda \quad\quad (34) \\ \alpha_{mj}(k) = 0.0 \\ \text{if } (I_{mj}(k) > 0.0) \text{ then } \alpha_{mj}(k) = I_T(k)/I_{mj}(k) \quad\quad (35) \\ \text{End do} \end{cases}$$

ii. Produce a single least-squares scale for each narrow-band spectrum from the color scales. Spectra from similar spectral types seem to be approximately offset by a common scale. $S_{mj}$ is chosen to minimize the error in flux for each color region, 1614
$$S_{mj} = \frac{\sum_{k=1}^{k\max} \alpha_{mj}(k)(I_{mj}(k))^2}{\sum_{k=1}^{k\max}(I_{mj}(k))^2} \quad\quad (30)$$

iii. Scale the narrow-band spectra to estimate scaled-spectrum for the target star:

1616
$$\begin{cases} \text{Do } \lambda=1, \lambda_{max} \\ \hat{h}_{mj}(\lambda) = S_{mj} h_{mj}(\lambda) \quad\quad (10) \\ \text{End do} \end{cases}$$

iv. Compute the estimated flux error for each scaled-estimate. The value $units_{EST}$ ensures the units of the scaled broad-band flux $\hat{I}_{mj}(k)$ match $I_T(k)$. The root sum square of the difference between $\hat{I}_{mj}(k)$ and $I_T(k)$ is treated as an error $\Delta\hat{h}_{mj}(\lambda)$.

Do $k=1$, $k_{max}$ $$\hat{I}_{mj}(k) = units_{EST} \sum_{\lambda=1}^{\lambda max} color(\lambda,k) \hat{h}_{mj}(\lambda) \Delta\lambda \quad\quad (37)$$

$$\Delta\hat{I}_{mj}(k) = sqrt((\hat{I}_{mj}(k) - I_T(k))^2) \quad\quad (38)$$

End do $$\Delta\hat{h}_{mj} = sqrt(\sum_{k=1}^{k\max}\Delta\hat{I}_{mj}(k)) \quad\quad (39)$$

1618

End do   [$mj$ loop]

FIG. 16B

```
err_min = Δĥ₁
ls_min_id = 1
spectal_type_best=spectral_type(1)
Do i=2,mj_max
    if (Δĥ_mj < err_min) then
        err_min = Δĥ_mj
        ls_min_id = i
        spectal_type_best=spectral_type(i)
    end if
End do
```

```
Do i=1,λ_max
    Do mj=1,k_max
        if (k_err=1)  ε_mj(λ_i) = 1
        if (k_err=2)  ε_mj(λ_i) = Δĥ_mj
        if (k_err=3)  ε_mj(λ) = sqrt(Σ_{k=1}^{kmax} cw(λ,k)(ΔÎ_mj(k))²)
    End do
End do
```

Do $k=1, k_{max}$ $$\hat{I}_W(k) = units_{EST} \sum_{\lambda=1}^{\lambda \max} color(\lambda,k)\hat{h}_W(\lambda)\Delta\lambda \quad (41)$$

$$\Delta\hat{I}_W(k) = sqrt((\hat{I}_W(k) - I_T(k))^2) \quad (42)$$

End do $$\Delta\hat{h}_W = sqrt(\sum_{k=1}^{ncolor} \Delta\hat{I}_W(k)) \quad (43)$$

Add to the scaled spectrum set any *à priori* spectra and associated error.
Do $i=1, \lambda_{max}$
    Do $mj=mj_{max}, mj_{max}+mj\_add$ 1642
$$\varepsilon_{mj}(\lambda_i) = add\_err_{mj}(i) \quad (39)$$
$$\hat{h}_{mj}(\lambda) = h_{mj}(\lambda) units_{mj} \quad (40)$$

End do
End do

For $n=1$ through $N$, increment by one wavelength bin
    I) $mj$ here represents only the first spectrum in the set 1644
$$X_P = \hat{h}_{mj}(\lambda_n)$$
$$V_P = \varepsilon_{mj}(\lambda_n) \quad (13)$$

II) Loop through the remainder of the spectra set
        For $mj=2^{nd}$ through last of spectrum of the set 1646
$$Z = \hat{h}_{mj}(\lambda_n)$$
$$R = \varepsilon_{mj}(\lambda_n) \quad (14)$$
$$K = 0.0$$
$$if(V_P^2 + R^2 > 0) \quad K = \frac{R^2}{V_P^2 + R^2} \quad (15)$$
$$X_N = KX_P + (1-K)Z$$
$$V_N^2 = K^2 V_P^2 + (1-K)^2 R^2$$
$$X_P = X_N$$
$$V_P = V_N \quad (16)$$

End For [spectra set loop]

1648
$$\hat{h}_W(\lambda_n) = X_P$$
$$\varepsilon_W(\lambda_n) = V_P \quad (17)$$

End For [wavelength loop]

CELESTIAL NAVIGATION USING STELLAR NARROW-BAND EMISSION

CROSS REFERENCE TO RELATED APPLICATION

Pursuant to 35 U.S.C. §119, the benefit of priority from provisional application 61/195,385, with a filing date of Sep. 30, 2008, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to celestial navigation for missile systems. In particular, the invention relates to characterizing celestial spectral information in conjunction with stellar catalogs and appropriate adjustments based on narrow-band spectral emission (NBSE).

Weapon systems that navigate by the stars are designed to view and examine stars that are suitable to the system's charge-coupled device (CCD) capabilities. The manufacturer's design defines the CCD's response to light, which can be expressed as a function of wavelength. The CCD response is integrated with each particular star's photometric spectrum. This integrated flux can be used to determine whether or not the star is useable for navigation by the weapon system. The main source for narrow-band photometry spectra is the Mitchell-Johnson (MJ) star catalog.

SUMMARY

Conventional stellar identification and characterization methods for celestial navigation yield disadvantages addressed by various exemplary embodiments of the present invention. In particular, such limitations cause severe inconvenience in characterizing all but a handful of bright stars.

Various exemplary embodiments provide a method for characterizing luminous celestial objects (e.g., stars) in celestial navigation of a missile system. The method includes segmenting, assigning, measuring, computing, ratioing, producing, scaling, and determining operations. Segmenting operation includes subdividing wavelength range into a plurality of discrete contiguous bins. Assigning operation arranges each bin of the plurality of bins into a plurality of color bands. Establishing operation sets a transmissivity to each bin of each color band; measuring luminous intensity from a target object for each bin as a plurality of measured intensities. Computing operation calculates broad-based fluxes for a reference value as a reference flux, the target object as a target flux estimate for each band, and a narrow-band library as a library flux.

In various exemplary embodiments, the reference and library fluxes include summing a first multiplication of the transmissivity for each bin and a reference luminous intensity for each bin over the plurality of bins. Ratioing operation computes a ratio between the target flux to the library flux as a color scale for each band. Squaring operation determines the library flux for each band as a library flux squared. Producing operation sums a spectral scale over the color bands a second multiplication of the color scale and the library flux squared as a first sum product, and sums over all the bands the library flux squared as a second sum product and dividing first sum product by the second sum product. Scaling operation factors each measured intensity of the plurality of measured intensities as a scaled intensity by multiplying each target intensity by the spectral scale for each bin. Determining operation sums a scaled broad-band flux for each band over the plurality of bins as a third multiplication of the transmissivity and the scaled intensity.

Various exemplary embodiments further include estimating an error for the band the target flux estimate from the scaled broad-band flux as a plurality of flux differences, and includes summing, subtracting, computing and determining operations. Summing operation adds a sum-square flux difference for each band from a square of each flux difference of the plurality of flux differences. Computing operation determines a root-sum-square flux difference for each band a square-root of the sum-square flux difference. Determining operation sums an intensity error estimate over all the color bands each root-sum-square flux difference as an intensity error estimate.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 13 is a tabular view of a Scaled Spectra Error and Weights;

FIG. 14 is a graphical view of Broad-Band Flux Errors;

FIG. 15 is a pseudo-code listing view of input parameters; and

FIG. 16A-16F are logical instruction listing views of operational steps.

DETAILED DESCRIPTION

Figure 1:
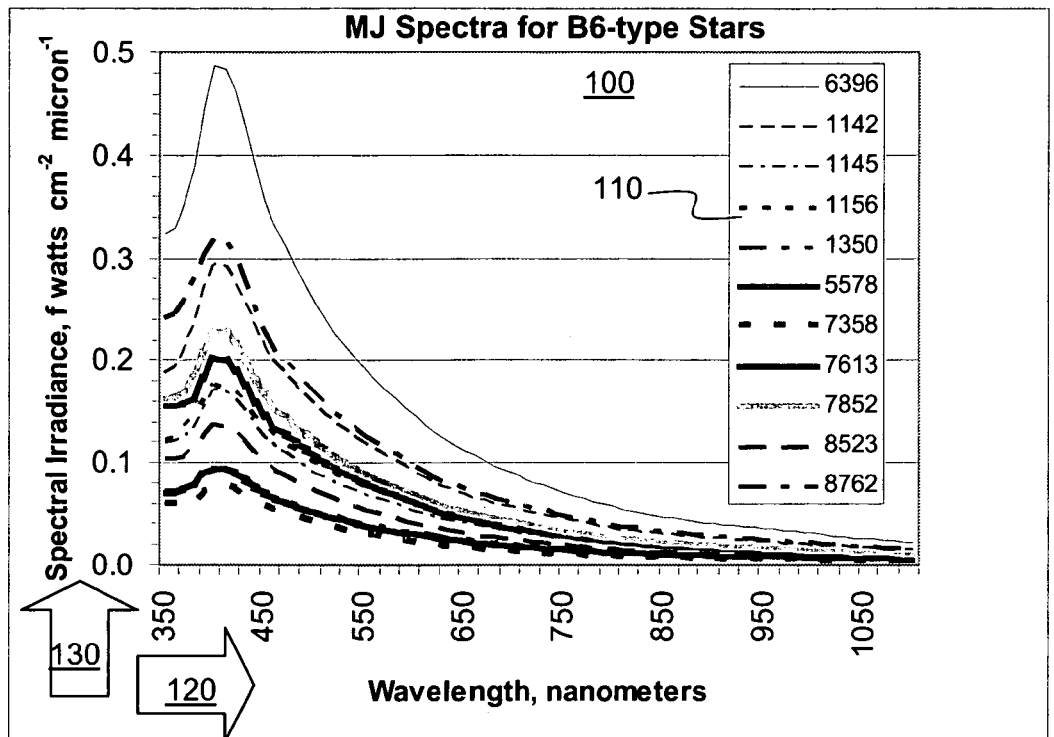
FIG. 1 is a graphical view of MJ Spectra for B6-type Stars.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Stellar navigation for missile systems employs orientation based on specific luminous celestial objects (e.g., stars) based on select electromagnetic emission characteristics for identification. Although the Mitchell-Johnson (MJ) catalog contains many bright stars, estimates of other stars' narrow-band photometry can provide information to guide the system more accurately.

This disclosure describes a method that uses broad-band photometry and spectral types to estimate the narrow-band spectra of non-MJ stars. The analysis incorporates narrow-band spectral emission (NBSE) characterization. The broad-band information is provided by the Hipparcos (HIP) star catalog. The broad-band photometry for a non-MJ star can be used to scale similar spectra from the MJ catalog.

The method also estimates errors of the scaled spectra. Analogous to Kalman filtering, these errors can be used as weights to combine the estimates of all similarly scaled spectra to calculate the Kalman estimated spectrum. The method can be easily automated so that thousands of spectra can be estimated in minutes. This disclosure describes that method, as well as aspects of its validation.

A weapon system's CCD sensitivity tunes to particular frequency bands and intensity of stellar light. Different stars have different frequency spectra; some stars are usable by the weapons system and others are not. In order to measure the CCD's sensitivity preferably employs narrow-band frequency estimates of the stars' spectra. Upon fielding of a CCD in a weapon system, operation includes construction of an initial star catalogue tuned to the performance of that device. Over time, whether due to system hardware upgrades or staleness of the original star catalog parameters, the weapon system's catalog of stars undergoes re-evaluation. Stars not usable before may subsequently be deemed beneficial due to the upgrade or catalog changes.

The various star catalogs offer much photometric information. Nonetheless, conventional techniques lack a process to rapidly filter all of this information so that limited resources can be focused on the most likely stars appropriate to the specific characteristics of the CCD. By applying the techniques described in this disclosure, hundreds of thousands of possibilities can quickly be screened to extract the critical few additions from the non-MJ star data. To accomplish this objective manually would constitute a lifetime effort. Once identified, the astronomers can apply more sophisticated techniques to improve on the 95% accurate spectra available from this filter approach.

The MJ catalog identified as "Thirteen-color Photometry of 1380 Bright Stars" by H. L. Johnson and R. I. Mitchell, *Rev. Mex. Astron. Astrofis*. vol. 1, pp. 299-324, has 1380 bright stars. Most of the catalog stars have thirteen narrow-bands of color flux. The Hipparcos (HIP) catalog from *The Hipparcos and Tycho Catalogues*, European Space Agency, 1997, ESA SP-1200, provides three broad-band color magnitudes for more than 100,000 stars. Only a fraction of HIP stars have corresponding MJ narrow-band spectra.

Traditionally, a non-MJ star's narrow-band photometry was manually estimated for a few select bright stars. This process takes a knowledgeable person a considerable period, but the disclosed methodology can be computationally automated and can quickly estimate narrow-band spectra for HIP stars. In addition, neighboring stars around any catalog star (whether MJ or non-MJ) can affect the CCD performance. The fainter neighboring stars are rarely included in the MJ catalog, so their narrow-band spectra are also estimated. This paper describes and validates a methodology that Naval Surface Warfare Center—Dahlgren Division (NSWCDD) uses to estimate non-MJ narrow-band spectra.

The methodology relies on using the MJ spectra as a library of narrow-band information. This library of information is cataloged by each star's Harvard Revised Identification Number (HR#) and characterized by its spectral type. A target star is chosen from the HIP catalog along with its spectral type and broad-band photometry.

All the MJ narrow-band spectra similar to the target star's spectral type are coarse-grained and scaled to match the HIP broad-band photometry. These scaled MJ narrow-band spectra provide a number of estimates of the target star's narrow-band spectrum. Each scaled estimate is associated with an expected error that indicates how close the estimated spectrum matches the broad-band information provided by HIP. These weights provide a single Kalman-type estimate of the target star's spectrum.

Narrow-Band Photometry: The 13-colored flux data from the MJ catalog are interpolated in wavelength every 10 nm from 350 nm to 1100 nm. The MJ spectrum is denoted as $h_{mj}(\lambda)$ where the subscript index "mj" represents the HR#. Every MJ spectrum is associated with a spectral type. FIG. 1 illustrates a graph 100 of MJ Spectra for B6 Spectral Type Stars. A legend 110 identifies the stars within the MJ catalog. The abscissa 120 denotes wavelength in nano-meters (nm) of the light received, and the ordinate 130 denotes the spectral irradiance in fW-cm$^{-2}$-$\mu$m$^{-1}$ (femto-watts-per-square-centimeter-per-micron).

All ten B6-type spectra reveal similarity in shape. The legend 110 identifies the corresponding HR# of each star. Stars with the same spectral type share similar spectra. For example, the top curve the graph 100 traces the MJ spectral irradiance for HR# 6396. The star HR# 6396 belongs to the spectra type B6. The ten other B6 stars' spectra from MJ are also plotted. In this example, HR# 6396 has greater spectral power than the other ten stars.

Figure 2:
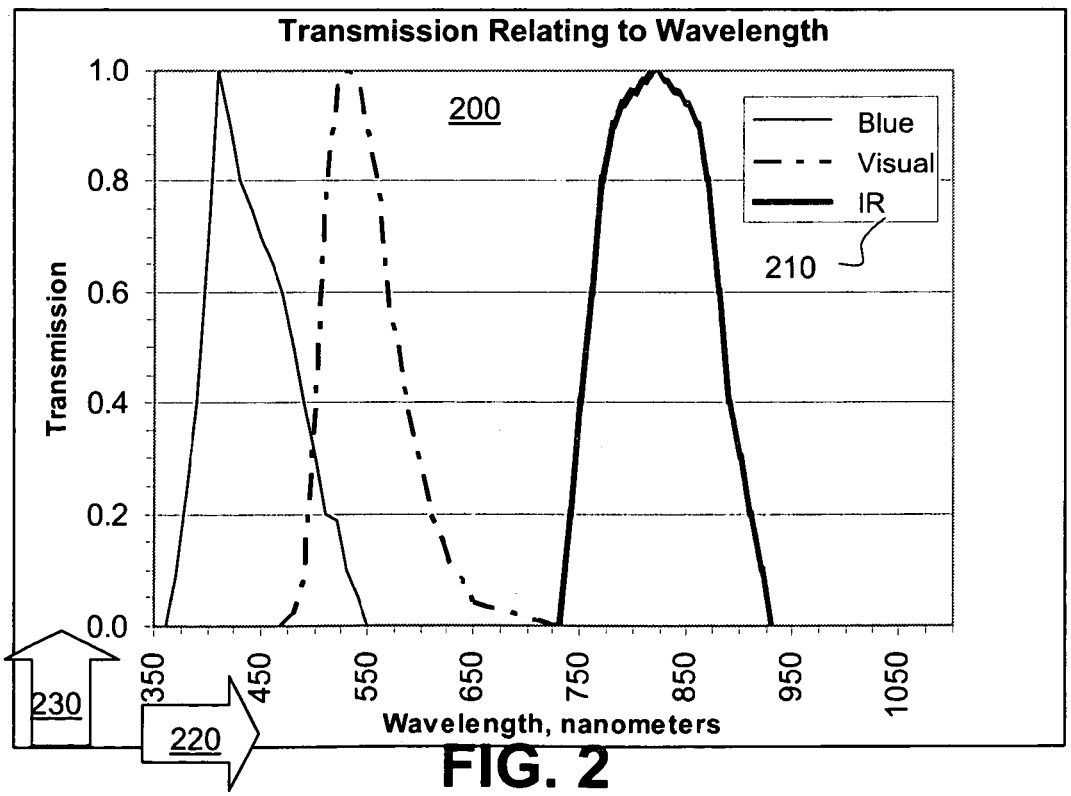
FIG. 2 is a graphical view of a Transmission Relating to Wavelength.

Broad-band Flux Estimates: FIG. 2 illustrates a graph 200 showing transmission of select electromagnetic energy bands as a function of wavelength $\lambda$. A legend 210 identifies blue, visual and infrared curves, with the abscissa 220 denoting wavelength and the ordinate 230 denoting normalized transmissivity. The corresponding peaks of the blue $b(\lambda)$, visual $v(\lambda)$, and infrared $i(\lambda)$ transmission curves respectively correspond to 410 nm, 530 nm and 820 nm.

For demonstration purposes estimates are provided for a target star included in both MJ and HIP. The stars' MJ spectra represent a collected set in which all have the same designated spectral type as the HIP star. In practice, this method would be most practical for non-MJ stars. However, for demonstration purposes, this method presented for both to describe the methodology. Subsequently, two additional examples of non-MJ stars are demonstrated.

The MJ spectra in the collected set are coarse-grained in order that MJ data can be compared with HIP provided broad-band photometry. One of the transmission curves shown in the graph 200 is multiplied with a star's spectrum at each applicable wavelength bin. This function-product represents a function of wavelength integrated to yield the broad-band flux for that respective color. The subscript index "mj" refers to the star's Harvard Revised Identification Number.

The series of relations in eqn (1) shows the color MJ broad-band fluxes $I_{mj}^{color}$ for blue, visual, and infrared respectively:

$$I_{mj}^{Blue} = \int_{350}^{1100} b(\lambda)h_{mj}(\lambda)\,d\lambda$$
$$I_{mj}^{Visual} = \int_{350}^{1100} v(\lambda)h_{mj}(\lambda)\,d\lambda \quad (1)$$
$$I_{mj}^{Infrared} = \int_{350}^{1100} i(\lambda)h_{mj}(\lambda)\,d\lambda,$$

where the definite integral over wavelength λ ranges from 350 nm to 1100 nm, and the $h_{mj}$ as a function of wavelength represents star's spectrum intensity.

Broad-band Hipparcos Photometry: Typically irradiance fluxes are referenced to Alpha-Lyrae (α-Lyrae, HR# 7001). The spectrum for Alpha-Lyrae $h_{7001}(\lambda)$ can be constructed from the 13-color MJ flux. From eqn (1), the associated blue, visual and infrared reference fluxes are calculated in eqn (2):

$$I_{7001}^{Blue} = \int_{350}^{1100} b(\lambda)h_{7001}(\lambda)\,d\lambda$$
$$I_{7001}^{Visual} = \int_{350}^{1100} v(\lambda)h_{7001}(\lambda)\,d\lambda \quad (2)$$
$$I_{7001}^{Infrared} = \int_{350}^{1100} i(\lambda)h_{7001}(\lambda)\,d\lambda.$$

The three color magnitudes B (blue), V (visual) and I (infrared) can be determined from interpolation of broadband color information B-V, V and V-I provided from the HIP catalog for the target star. The reference color magnitudes for Alpha-Lyrae are set as b=v=i=0.03. The difference between the reference magnitudes and the HIP color magnitudes can be used to estimate the broad-band fluxes. The color magnitudes are defined such that a difference of five apparent magnitudes translates to the lower-magnitude star being one hundred times brighter than the higher-magnitude from B. W. Caroll and D. A. Ostlie, *Modern Astrophysics*, Addison-Wesley Publishing Co., Reading Mass., 1996; ch. 3. The broadband color fluxes $\hat{I}_{hip}^{color}$ respectively blue, visual and infrared, for a particular HIP star are related to the magnitudes:

$$\hat{I}_{hip}^{Blue} = I_{7001}^{Blue} 10^{0.4(b-B)}$$
$$\hat{I}_{hip}^{Visual} = I_{7001}^{Visual} 10^{0.4(v-V)} \quad (3)$$
$$\hat{I}_{hip}^{Infrared} = I_{7001}^{Infrared} 10^{0.4(i-I)},$$

where the magnitude fluxes correlate to the reference fluxes by a factor of $10^{0.4c} 32\,1.49^c$ in which exponent c corresponds to the reference-to-broadband color difference.

Scaling: The graph 100 in FIG. 1 suggests that a star's spectrum can be scaled to match the spectrum of the target star. The three HIP broadband fluxes can be used with the three MJ fluxes to give three different estimates of this scale. For a given MJ spectrum $h_{mj}(\lambda)$ and the three HIP color magnitudes, a scale can be calculated for each of the three colors, as provided in eqns (4), (5) and (6). The scales for the colors correspond to $\alpha_{mj}$ for blue, $\beta_{mj}$ for visual and $\gamma_{mj}$ for infrared. Each scale constitutes a simple ratio of the HIP flux over the MJ flux:

$$\alpha_{mj} = \frac{\hat{I}_{hip}^{Blue}}{I_{mj}^{Blue}} \text{ is the blue scale,} \quad (4)$$

$$\beta_{mj} = \frac{\hat{I}_{hip}^{Visual}}{I_{mj}^{Visual}} \text{ is the visual scale, and} \quad (5)$$

$$\gamma_{mj} = \frac{\hat{I}_{hip}^{Infrared}}{I_{mj}^{Infrared}} \text{ is the infrared scale.} \quad (6)$$

Scale Estimation of the Narrow-Band Spectrum: Spectra from similar spectral types seem to be approximately offset by a common scale. A least-squares approach can be used to calculate this common scale $S_{mj}$, which is selected to minimize the error in flux for each color region. The errors δ by color region are shown in the set of eqn (7):

$$\delta_{Blue} = (S_{mj} - \alpha_{mj})I_{mj}^{Blue}$$
$$\delta_{Visual} = (S_{mj} - \beta_{mj})I_{mj}^{Visual} \quad (7)$$
$$\delta_{Infrared} = (S_{mj} - \gamma_{mj})I_{mj}^{Infrared},$$

such that the error denotes the product of the flux and the difference between the common and color scales. The region errors can be assumed to be independent, such that the total square of the flux error can be expressed as:

$$\delta_{mj}^2 = \delta_{Blue}^2 + \delta_{Visual}^2 + \delta_{Infrared}^2 \quad (8)$$

The total flux error can be minimized with respect to the common scale $S_{mj}$ as:

$$S_{mj} = \frac{\alpha_{mj}(I_{mj}^{Blue})^2 + \beta_{mj}(I_{mj}^{Visual})^2 + \delta_{mj}(I_{mj}^{Infrared})^2}{(I_{mj}^{Blue})^2 + (I_{mj}^{Visual})^2 + (I_{mj}^{Infrared})^2} \quad (9)$$

where the "mj" estimation $\hat{h}_{mj}$ of the target star's narrow-band spectrum can be expressed from the intensity $h_{mj}$ in eqn (10) as:

$$\hat{h}_{mj}(\lambda) = S_{mj} h_{mj}(\lambda) \quad (10)$$

Figures 3, 4:
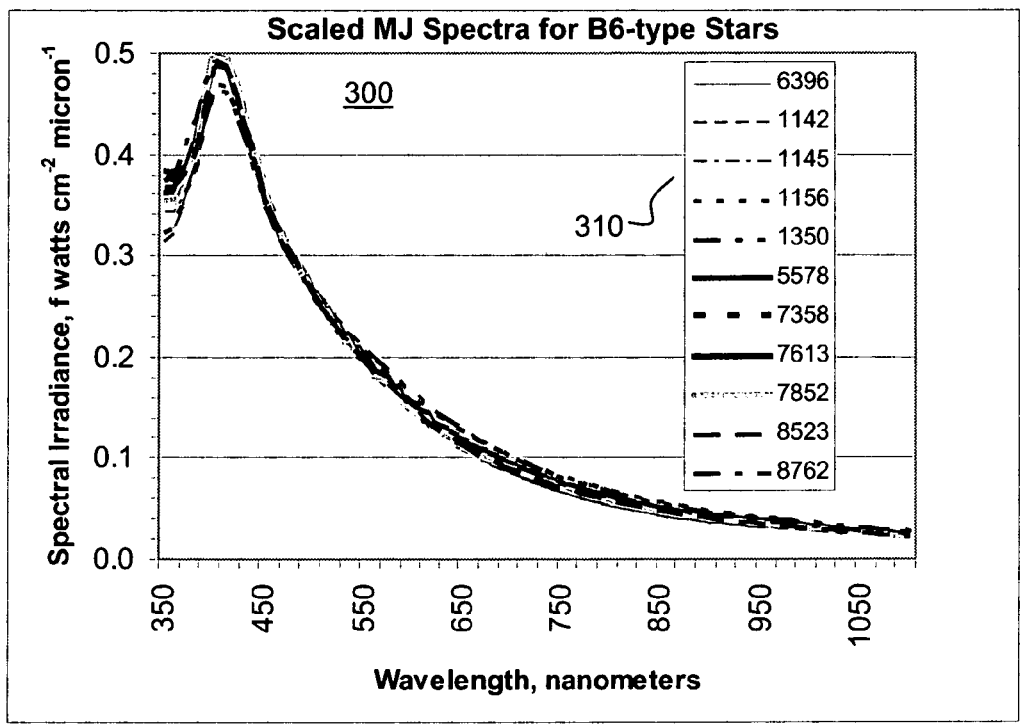
FIG. 3 is a graphical view of Scaled MJ Spectra for B6-type Stars.
FIG. 4 is a tabular view of Scales and Scaling Errors for HR# 6396.

FIG. 3 shows a graph 300 with the scaled MJ spectra $\hat{h}_{mj}(\lambda)$ plotted as spectral irradiance for B6 Stars. The abscissa and ordinate correspond to the same parameters and ranges as in the graph 100 of FIG. 1 for stellar un-scaled spectra. The legend 310 identifies the same stars in the graph 100 with their respective HR#, as their counterparts for scaled spectra.

Each scaled MJ spectrum is "coarse-grained" as shown in eqn (11) as a procedure from eqn (1):

$$\hat{I}_{mj}^{Blue} = \int_{350}^{1100} b(\lambda)\hat{h}_{mj}(\lambda)\,d\lambda$$
$$\hat{I}_{mj}^{Visual} = \int_{350}^{1100} v(\lambda)\hat{h}_{mj}(\lambda)\,d\lambda \quad (11)$$
$$\hat{I}_{mj}^{Infrared} = \int_{350}^{1100} i(\lambda)\hat{h}_{mj}(\lambda)\,d\lambda,$$

where the relations employ the form in eqn (2) using reference values for the broad-band values of flux and intensity.

The difference between the scaled broad-band fluxes provided in eqn (11) and the HIP fluxes in eqn (3) represents a quality measure of the scaling. Although there exists some wavelength overlap between the blue and visual fluxes, their differences are treated as independent. Thus, the root-sum-square of these differences can be treated as an error in the scaled spectrum:

$$\varepsilon_{mj}^{SCALED} = \sqrt{\left(\hat{I}_{mj}^{Blue} - \hat{I}_{hip}^{Blue}\right)^2 + \left(\hat{I}_{mj}^{Visual} - \hat{I}_{hip}^{Visual}\right)^2 + \left(\hat{I}_{mj}^{Infrared} - \hat{I}_{hip}^{Infrared}\right)^2}, \quad (12)$$

where $\varepsilon_{mj}^{SCALED}$ represents this error combining color-independent differences between the MJ and HIP components.

FIG. 4 shows tabular scales and scaling errors. Table 1 provides a first tabular list 400 with scales for the ten spectra shown in FIG. 1 that match to the broad-band flux of HR# 6396. The Hipparcos color magnitudes for HR# 6396 (HIP# 83895) are B=3.05, V=3.17, I=3.31. Notice this set of blue stars favors the blue scales in the determination of common scale $S_{mj}$. Table 2 in FIG. 4 provides a second tabular list 410 that displays corresponding error for each of the ten spectra estimates.

One way to provide a single estimate of the spectrum for the target star is to choose the scaled estimate with the least scaling error. In Table 2, HR# 8762 corresponds to the scaled spectrum with the least flux error. This best-scaled estimate is denoted as $\hat{h}_{SCALED}(\lambda)$, and its error as $\varepsilon_{SCALED}$. Error units are in scaled in fW-cm$^{-2}$-μm$^{-1}$. The total integrated power of the spectrum of HR# 6396 is 107 fW-cm$^{-2}$-μm$^{-1}$. The error in the best-scaled estimate is about 12% of the total integrated power.

Weighting Algorithm of the Narrow-Band Spectrum: A Kalman-type estimate for the spectrum can be constructed from the multiple scaled estimates with associated errors. Information from all of the scaled spectra can provide an estimate that typically has less flux error than the best-scaled estimate. The wavelength range can be divided into seventy-six wavelength bins of width 10 nm each. The bins range extends from 350 nm to 1100 nm. Each wavelength bin is denoted by $\lambda_n$. For this example, wavelengths bins are denoted as $\lambda_1$=350 nm, $\lambda_2$=360 nm, . . . , $\lambda_{76}$=1100 nm, and the value N=76 is used as the maximum wavelength bin.

For a particular wavelength bin $\lambda_n$, let $X_P$ take the value of the "previous" estimate of the spectrum with a flux error of $V_P$. The first "previous" estimate is obtained from the first scaled spectrum. The "current" scaled spectrum Z has a flux error of R. The Kalman weight K weighs the "previous" and "current" spectrum to construct the "new" estimate $X_N$ with error $V_N$. The new state replaces the previous. This process is repeated until the last scaled spectra are incorporated into the final weighted spectrum $\hat{h}_W(\lambda_n)$ with error $\varepsilon_W(\lambda_n)$. The estimation is performed for all wavelength bins.

In this procedure, values are evaluated across each of the wavelength bins, stepping incrementally. For n=1, 2, . . . , N, the process increments by one wavelength bin at the end of each process:

I) For the first spectrum of the set, denoted as mj, previous values of estimate and error are provided:

$$\left.\begin{array}{l} X_P = \hat{h}_{mj}(\lambda_n) \\ V_P = \varepsilon_{mj}(\lambda_n). \end{array}\right\} \quad (13)$$

II) Then, the remainder of the spectra set can be evaluated in a process loop. For the second through last mj of the spectrum of the set, the current and flux error are provided:

$$\left.\begin{array}{l} Z = \hat{h}_{mj}(\lambda_n) \\ R = \varepsilon_{mj}(\lambda_n), \end{array}\right\} \quad (14)$$

followed by Kalman weighting as:

$$K = 0.0 \text{ initially,} \quad \text{if } (V_P^2 + R^2 > 0) \text{ then } K = \frac{R^2}{V_P^2 + R^2}, \quad (15)$$

followed by new estimate and error based on the weighting the previous values, and resetting the next previous values from the new values:

$$\left.\begin{array}{l} X_N = KX_P + (1 - K)Z \\ V_N^2 = K^2 V_P^2 + (1 - K)^2 R^2 \\ X_P = X_N \\ V_P = V_N, \end{array}\right\} \quad (16)$$

thereupon the spectra set loop terminates after reaching convergence. The process increments over each wavelength bin until completion to establish values of estimated flux and error:

$$\left.\begin{array}{l} \hat{h}_W(\lambda_n) = X_P \\ \varepsilon_W(\lambda_n) = V_P, \end{array}\right\} \quad (17)$$

thereupon the wavelength loop terminates at the end of the wavelength bins.

The scaled spectrum is denoted as $\hat{h}_{mj}(\lambda_n)$. For the target star HR# 6396 example, the index mj includes the star HR# 1142 as the first star, HR# 1145 as the second, and so on until the tenth star (HR# 8762). The scaled error is represented as $\varepsilon_{mj}(\lambda_n)$. In the procedure, the error can be generalized to be a function of wavelength. Although these error terms are set in eqns (18) and (19) as a constant for all wavelength bins in each MJ spectrum, this does not apply to filling in (i.e., extrapolating) missing MJ narrow-band data.

When the error term $\varepsilon_{mj}(\lambda_n)$ is set to unity for all wavelength bins, the average of the spectra can be established as the estimate:

$$\left.\begin{array}{l} \hat{h}_{AVE}(\lambda_n) = \hat{h}_W(\lambda_n) \\ \varepsilon_{AVE}(\lambda_n) = 1, \end{array}\right\} \quad (18)$$

where subscript AVE identifies average values based on weighting values described previously. When the error term $\varepsilon_{mj}(\lambda_n)$ is set to the scaled error $\varepsilon_{mj}^{SCALED}(\lambda_n)$ shown in eqn (12), the Kalman (or weighted) average can be used as the estimate:

$$\left.\begin{array}{l}\hat{h}_{AVE}(\lambda_n) = \hat{h}_W(\lambda_n) \\ \varepsilon_{KAL}(\lambda_n) = \varepsilon_W(\lambda_n)\end{array}\right\} \quad (19)$$

where subscript KAL identifies Kalman error based on weighting values described previously. As with the best-scaled spectrum estimate, this provides a measure of the quality of the estimate. The process first calculates the three broad-band fluxes in eqns (20) and (210:

$$\left.\begin{array}{l}\hat{I}_{AVE}^{Blue} = \int_{350}^{1100} b(\lambda)\hat{h}_{AVE}(\lambda)d\lambda \\ \hat{I}_{AVE}^{Visual} = \int_{350}^{1100} v(\lambda)\hat{h}_{AVR}(\lambda)d\lambda \\ \hat{I}_{AVE}^{Infrared} = \int_{350}^{1100} i(\lambda)\hat{h}_{AVE}(\lambda)d\lambda,\end{array}\right\} \quad (20)$$

for the average estimates, and $$\left.\begin{array}{l}\hat{I}_{KAL}^{Blue} = \int_{350}^{1100} b(\lambda)\hat{h}_{KAL}(\lambda)d\lambda \\ \hat{I}_{KAL}^{Visual} = \int_{350}^{1100} v(\lambda)\hat{h}_{KAL}(\lambda)d\lambda \\ \hat{I}_{KAL}^{Infrared} = \int_{350}^{1100} i(\lambda)\hat{h}_{KAL}(\lambda)d\lambda,\end{array}\right\} \quad (21)$$

for the Kalman estimates.

The differences between these scaled broad-band fluxes given in eqns (20) and (21) with the HIP fluxes given in eqn (3) are treated as the error in the respective estimates for average and Kalman errors:

$$\varepsilon_{AVE} = \sqrt{\left(\hat{I}_{AVE}^{Blue} - \hat{I}_{hip}^{Blue}\right)^2 + \left(\hat{I}_{AVE}^{Visual} - \hat{I}_{hip}^{Visual}\right)^2 + \left(\hat{I}_{AVE}^{Infrared} - \hat{I}_{hip}^{Infrared}\right)^2} \quad (22)$$

$$\varepsilon_{KAL} = \sqrt{\left(\hat{I}_{KAL}^{Blue} - \hat{I}_{hip}^{Blue}\right)^2 + \left(\hat{I}_{KAL}^{Visual} - \hat{I}_{hip}^{Visual}\right)^2 + \left(\hat{I}_{KAL}^{Infrared} - \hat{I}_{hip}^{Infrared}\right)^2}. \quad (23)$$

Thus, three estimates of the target star's spectrum and a measure of the "expected" error for each of those estimates are thereby established.

Method Validation: In the above example, HR# 6396 has been selected as the target star. The MJ data collected included a set of spectra that did not include the target star. The estimates were established based on scaling the MJ set using HIP color data.

Figure 5A:
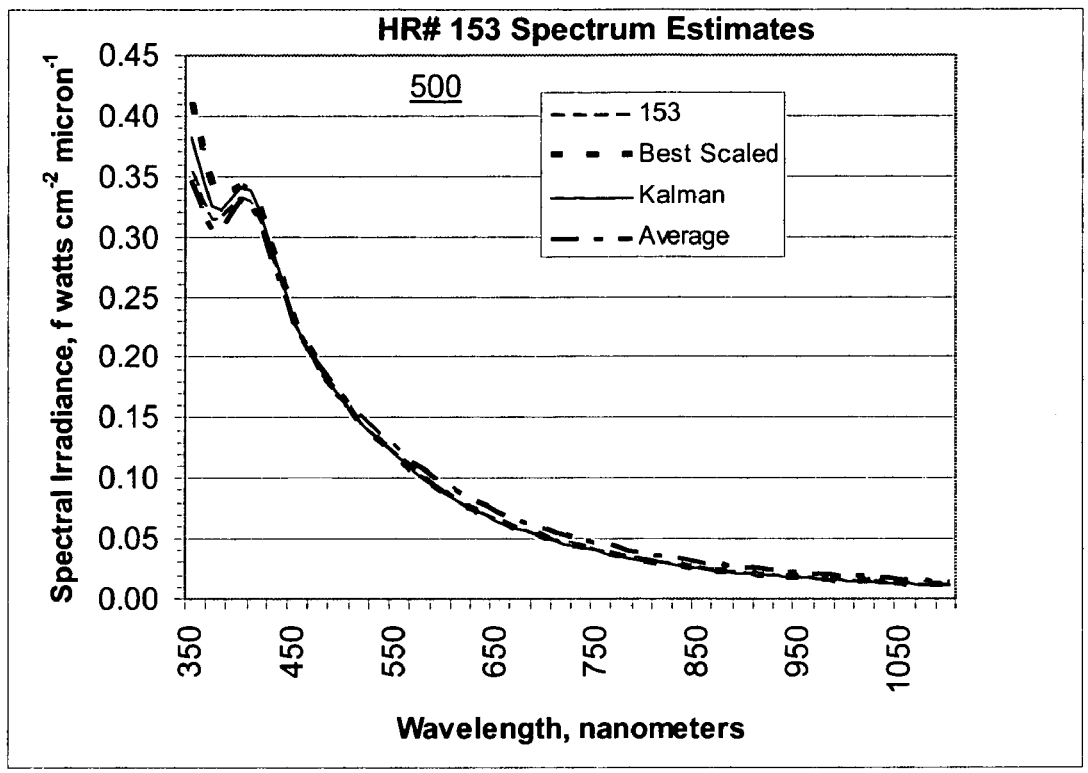
FIGS. 5A-5G are graphical views of Spectrum Estimates for HR# 153, 649, 1002, 1852, 4287, 5226 and 7936.
Figure 5B:
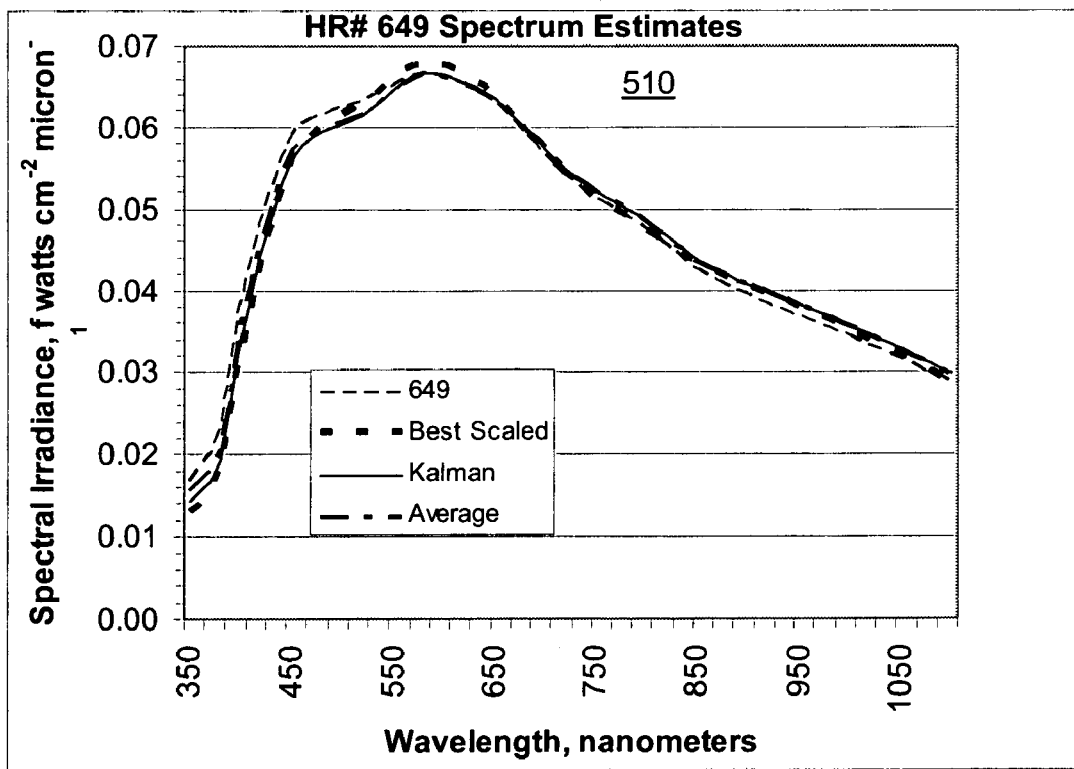
Figure 5C:
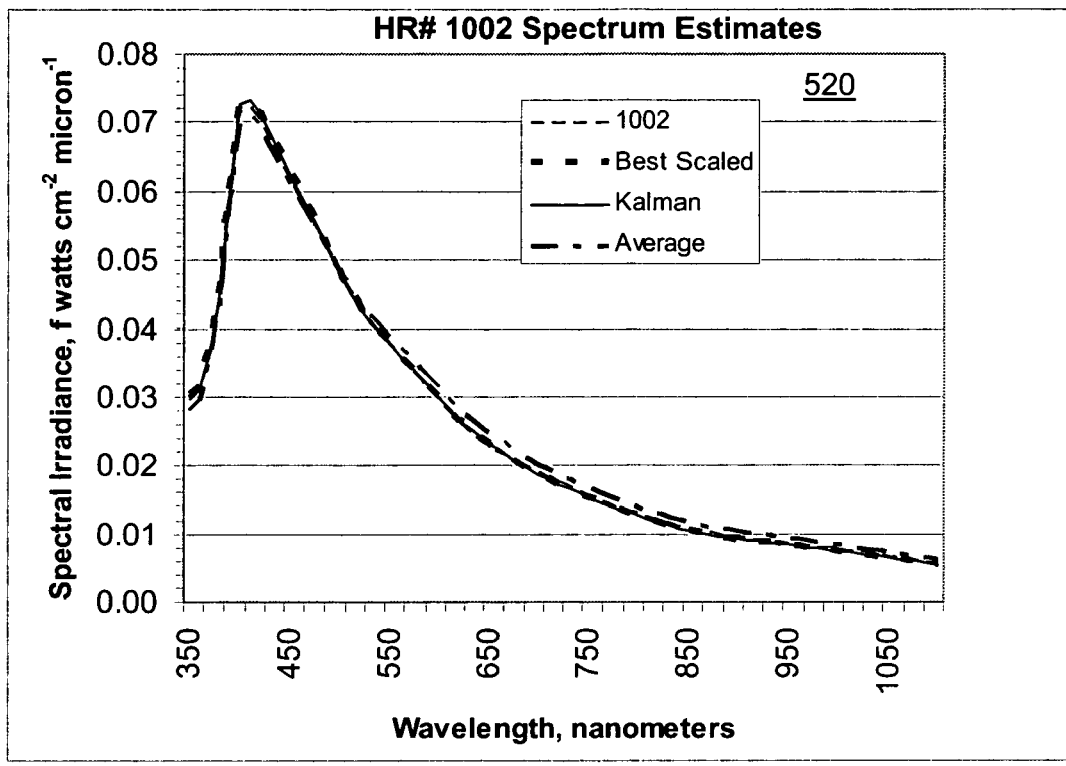
Figure 5D:
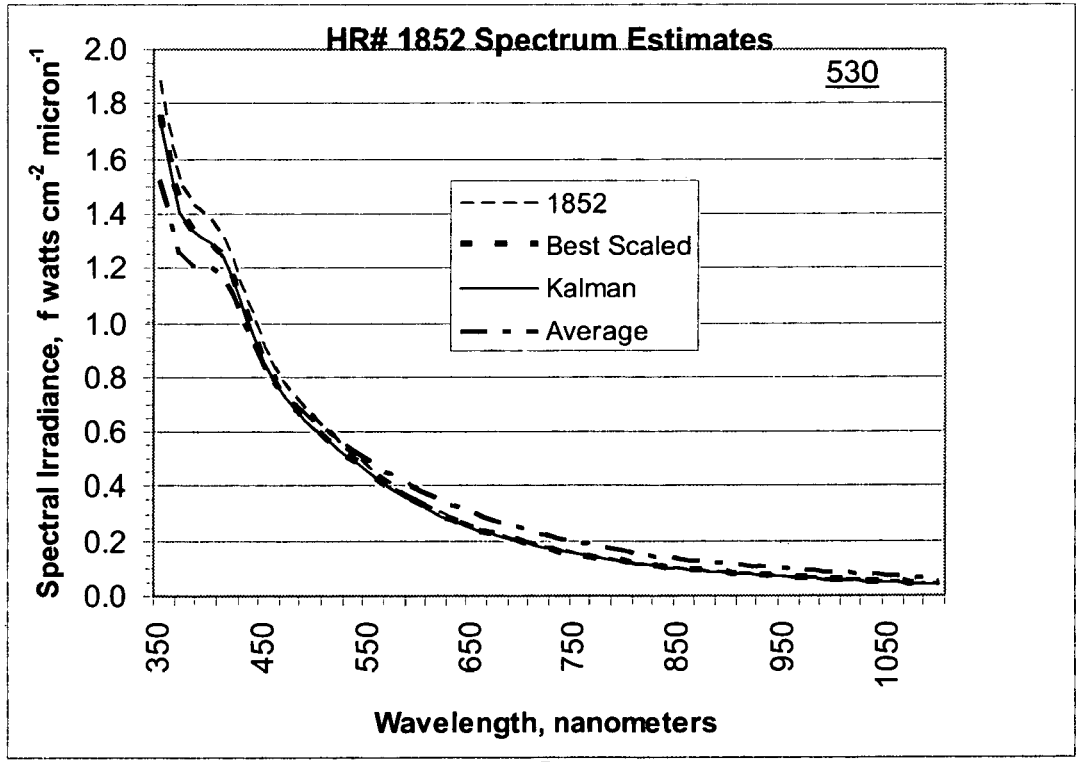
Figure 5E:
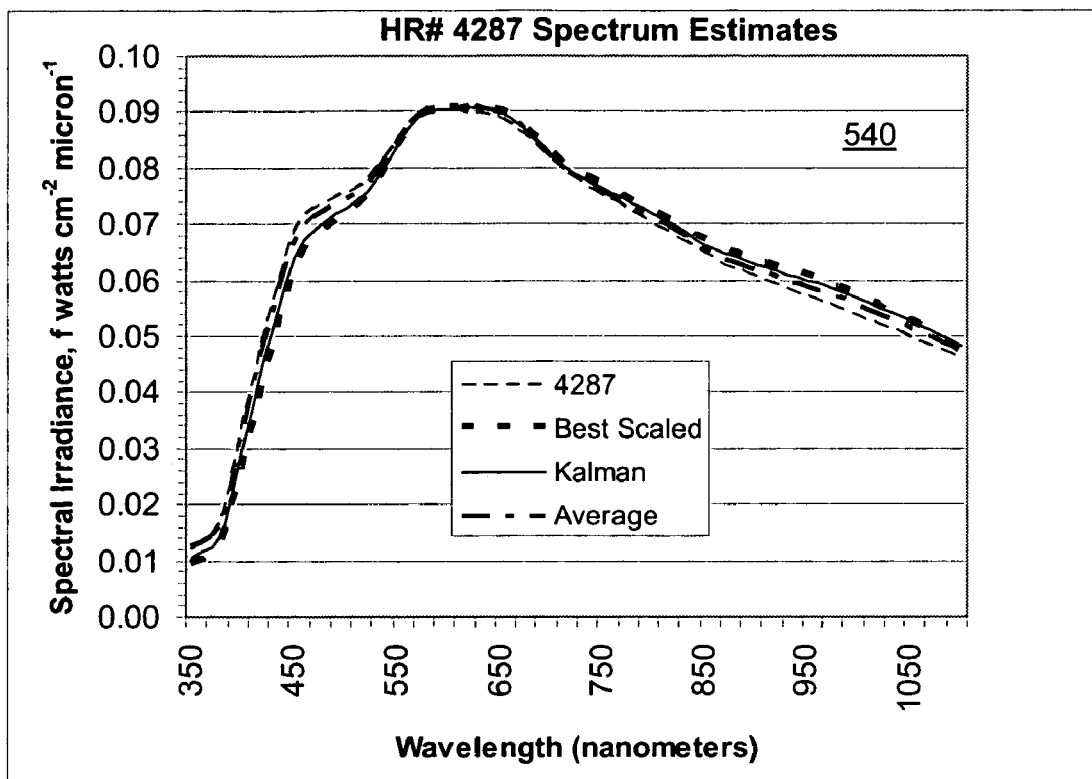
Figure 5F:
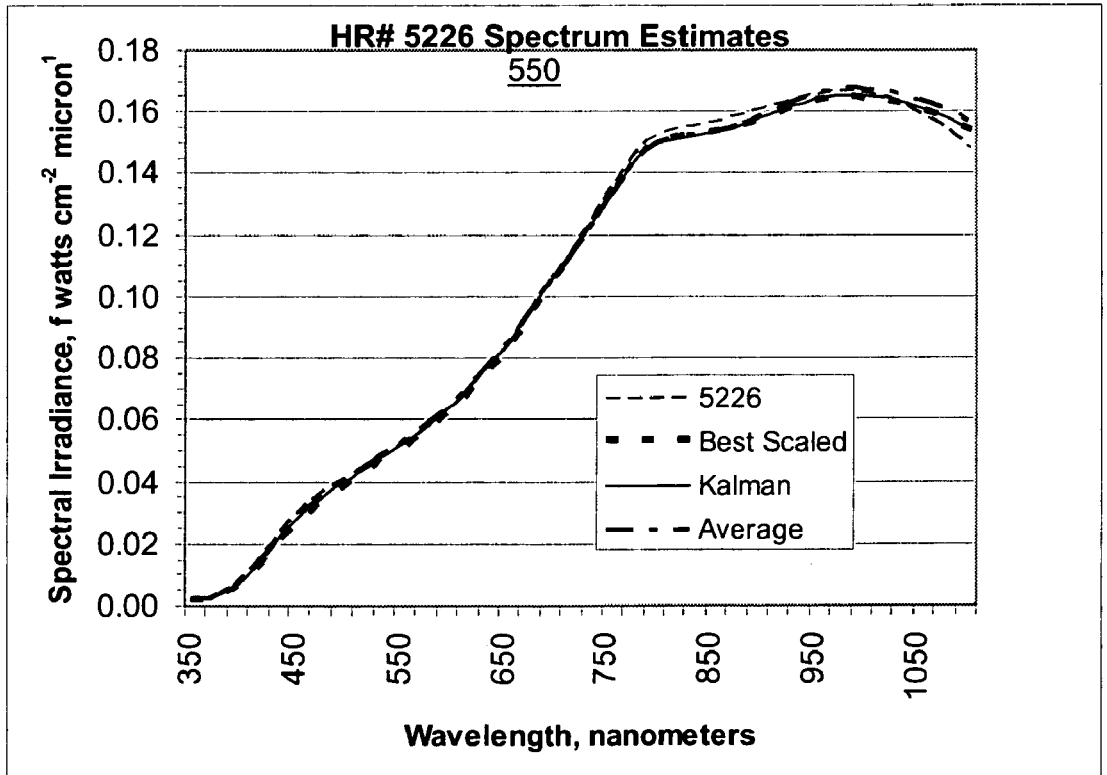

FIGS. 5A through 5G illustrate graphs of spectrum estimates for several stars in the catalogs for several spectral types: B, G, A, O, K, M, and F, respectively. The target star's actual MJ narrow-band spectrum is also shown for comparison; this reference curve is labeled with its HR number in the legend. The graphs are listed as follows, with similar legends. The abscissa and ordinate are common to all these graphs, although the scale of the latter varies:

FIG. 5A shows HR# 153 Spectrum Estimates (B2 V) as graph 500;

FIG. 5B shows HR# 649 Spectrum Estimates (G8 II) as graph 510;

FIG. 5C shows HR# 1002 Spectrum Estimates (A3 V) as graph 520;

FIG. 5D shows HR# 1852 Spectrum Estimates (O9.5 II) as graph 530;

FIG. 5E shows HR# 4287 Spectrum Estimates (K0 III) as graph 540;

FIG. 5F shows HR# 5226 Spectrum Estimates (M3) as graph 550; and

Figure 5G:
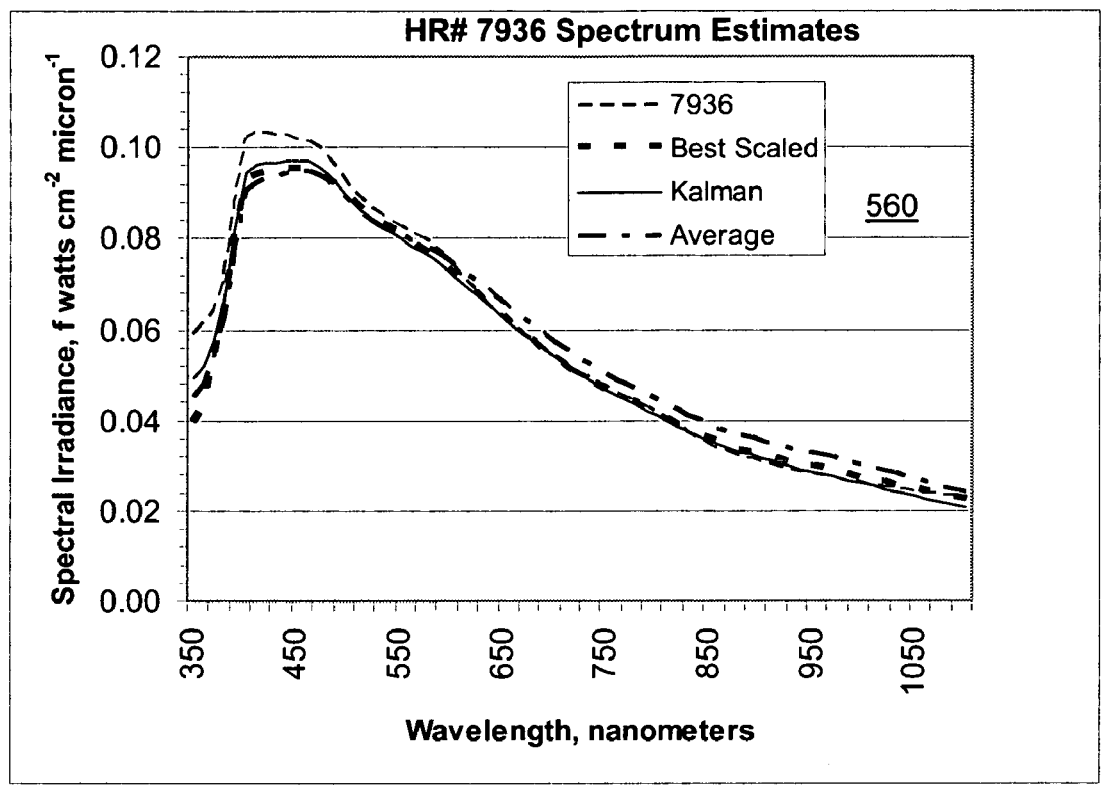

FIG. 5G shows HR# 7936 Spectrum Estimates (F5 V) as graph 560.

Graph 560 in FIG. 5G shows all three spectrum estimates to be slightly offset near the maximum value. This is largely due to the MJ estimates of the B6 magnitudes not being consistent with Hipparcos for the star HR# 7936. Coarse-graining the narrow-band MJ by eqn (1) yields broad-band fluxes: $I_{7936}^{Blue}$, $I_{7936}^{Visual}$ and $I_{7936}^{Infrared}$. Then, inverting eqn (3) to calculate the magnitude estimates yields adjusted transmissivity values:

$$\left.\begin{array}{l}b_{7936} = b - 2.5\log_{10}\left(\frac{I_{7936}^{Blue}}{\hat{I}_{7001}^{Blue}}\right) = 4.49 \\ v_{7936} = v - 2.5\log_{10}\left(\frac{I_{7936}^{Visual}}{\hat{I}_{7001}^{Visual}}\right) = 4.12 \\ i_{7936} = i - 2.5\log_{10}\left(\frac{I_{7936}^{Infrared}}{\hat{I}_{7001}^{Infrared}}\right) = 3.63,\end{array}\right\} \quad (24)$$

by correcting the baseline value by the value of the color reference values for Alpha-Lyrae.

The Hipparcos magnitudes are B=4.56, V=4.13, and I=3.64. Although B is a bit dimmer than $b_{7936}$, the difference is sufficient to cause the algorithm to estimate the spectrum with lower power. This observation holds especially valid in the blue region. Identifying which catalog is more correct requires further investigation, but this can be neglected in demonstrating the validity of the method.

One manner of measuring the process error involves supplying the MJ derived magnitudes for the target star, and not the HIP color magnitudes, into the methodology described previously explained. Because MJ and HIP occasionally differ on spectral type, the MJ designation is preferentially employed for this purpose. This control enables separation of the algorithm error from the two catalogs' broad-band differences.

Figure 6:
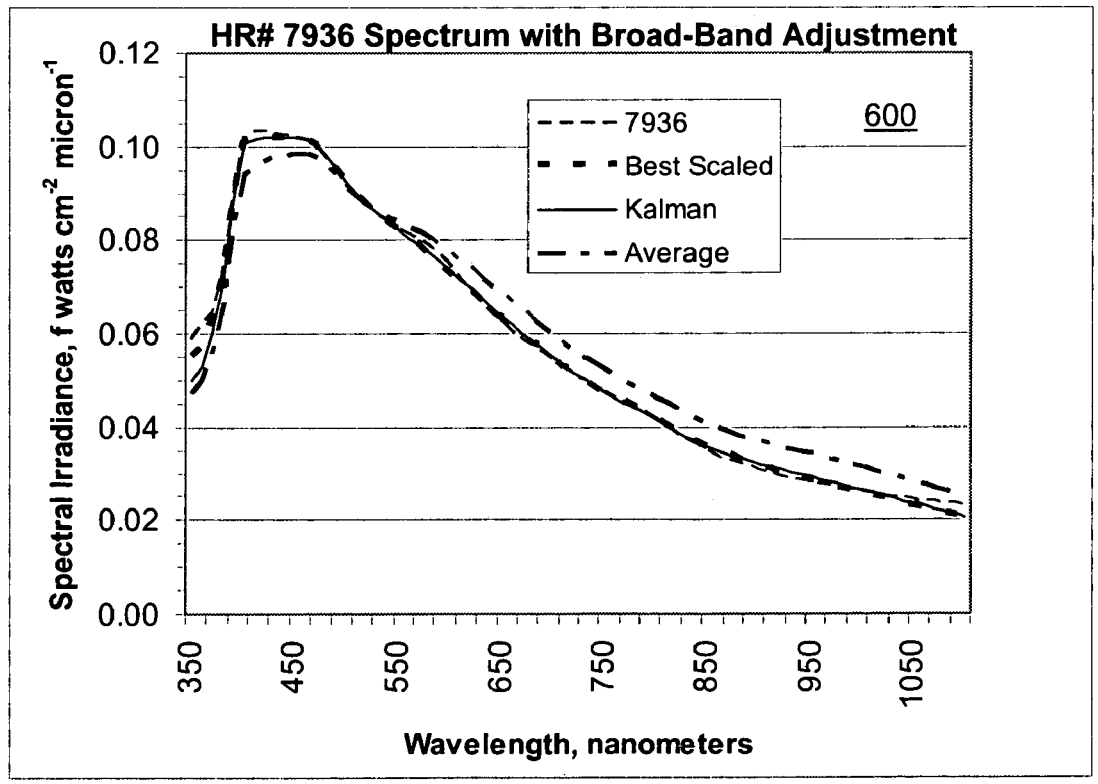
FIG. 6 is a graphical view of Spectrum Estimates for HR# 7936 with Broad-Band Adjustment.

FIG. 6 shows a graph 600 featuring the HR# 7936 Spectrum Using MJ Derived Broad-Band Magnitudes. The MJ spectrum estimates for HR# 7936 are based on using MJ "broad-band" information. The Kalman and the best-scaled estimate fare better than the average, and yet all fare better than the HIP driven estimates shown in graph 560 of FIG. 5G by comparison. The percent flux difference δ is defined in eqn (25), shown as a percentage: In this relation, $\hat{h}(\lambda)$ represents the average, Kalman or best-scaled spectrum estimation, depending on that being used. The reference MJ spectrum is represented by $h_{ref}(\lambda)$:

$$\%\delta = \frac{\int_{350}^{1100}\hat{h}(\lambda)d\lambda - \int_{350}^{1100}h_{ref}(\lambda)d\lambda}{\int_{350}^{1100}h_{ref}(\lambda)d\lambda} \times 100. \quad (25)$$

Figures 7, 8A:
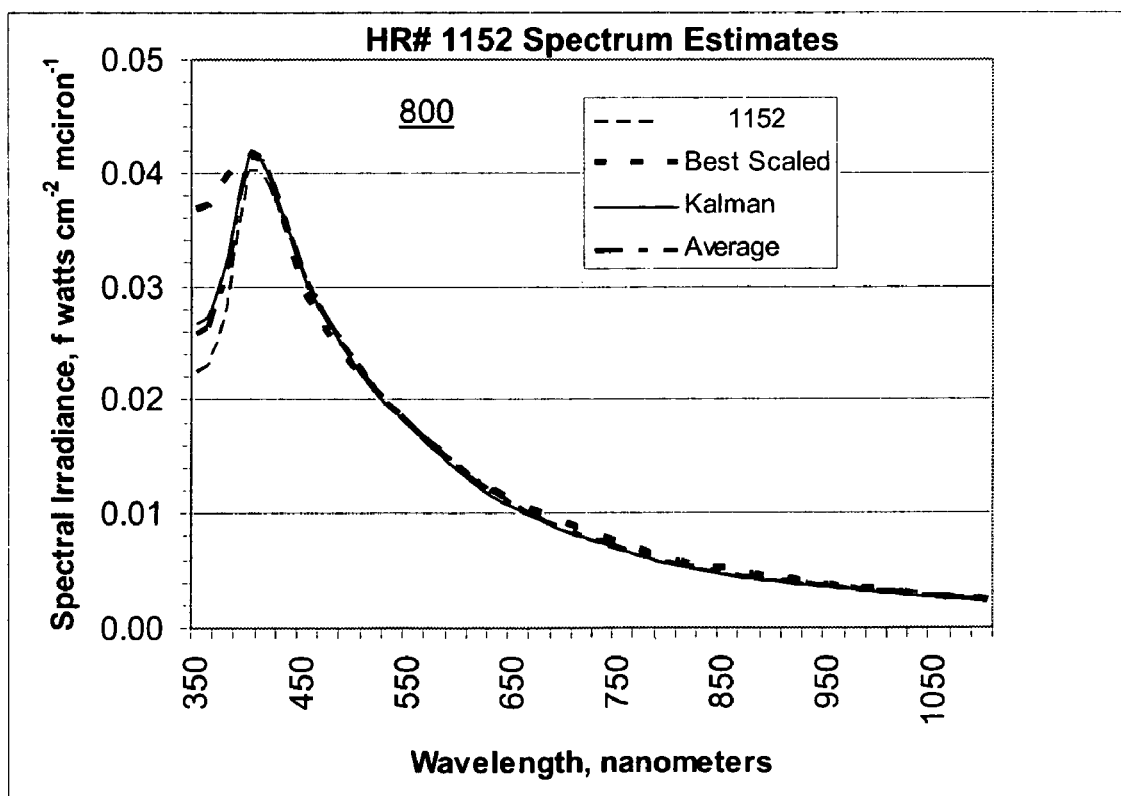
FIG. 7 is a tabular view of Process Error Validation.
FIGS. 8A-8F are a graphical views of Spectrum Estimates for HR# 1152, 5288, 6396, 6406 and 6567.

The percent flux differences can be calculated for each of the 1217 MJ stars that contain red data. The MJ catalog lacks red data for 163 stars. FIG. 7 provides a tabular list 700 as Table 3 showing the square-root of the sum of the meansquared and variance for the 1217 percent differences. The algorithm error uses MJ derived color magnitudes. For a target star having a unique spectral type within MJ, that star is excluded in the sample. The tabular list 700 compares the algorithm error with the expected errors calculated by eqns (12), (22) and (23). The algorithm error is much bigger than the expected error. However, by omitting a handful of very red problem stars from the sample, the process error statistics nearly match the expected error for 1212 stars. Table 3 in FIG. 7 shows that the statistics for the average spectrum estimates perform worse than Kalman or best-scaled. The best-scaled estimates match the Kalman estimate. Initially, this may suggest that Kalman estimate does not improve the estimate.

Figure 8B:
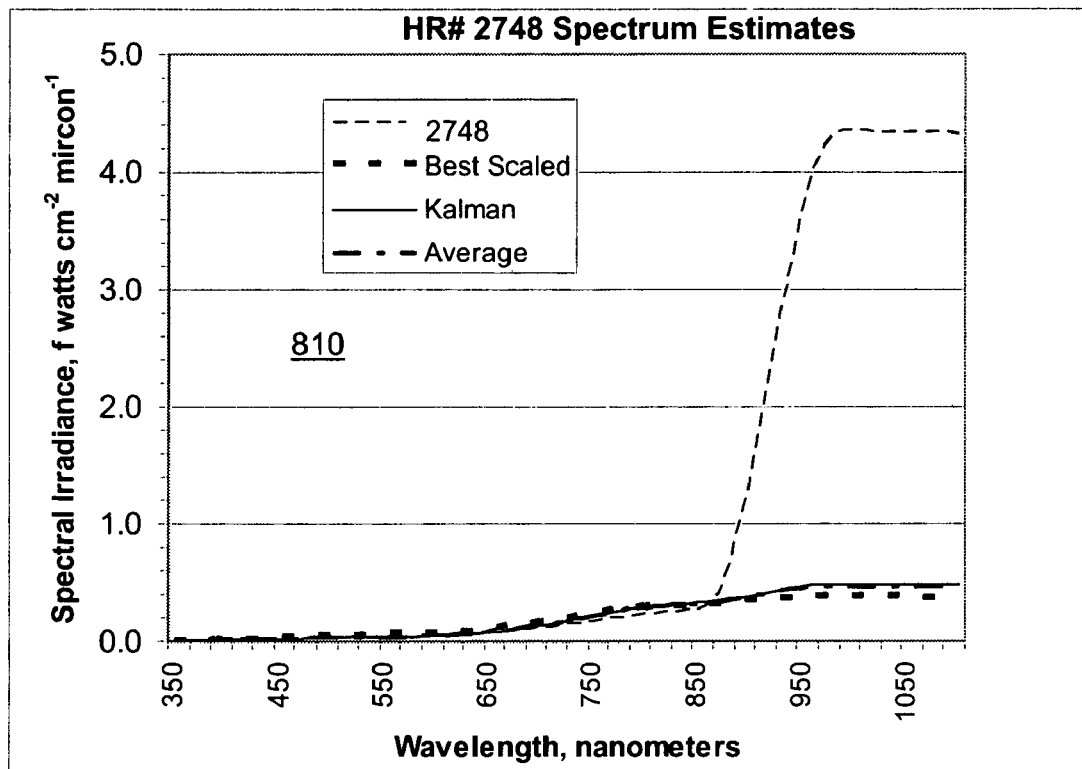
Figure 8C:
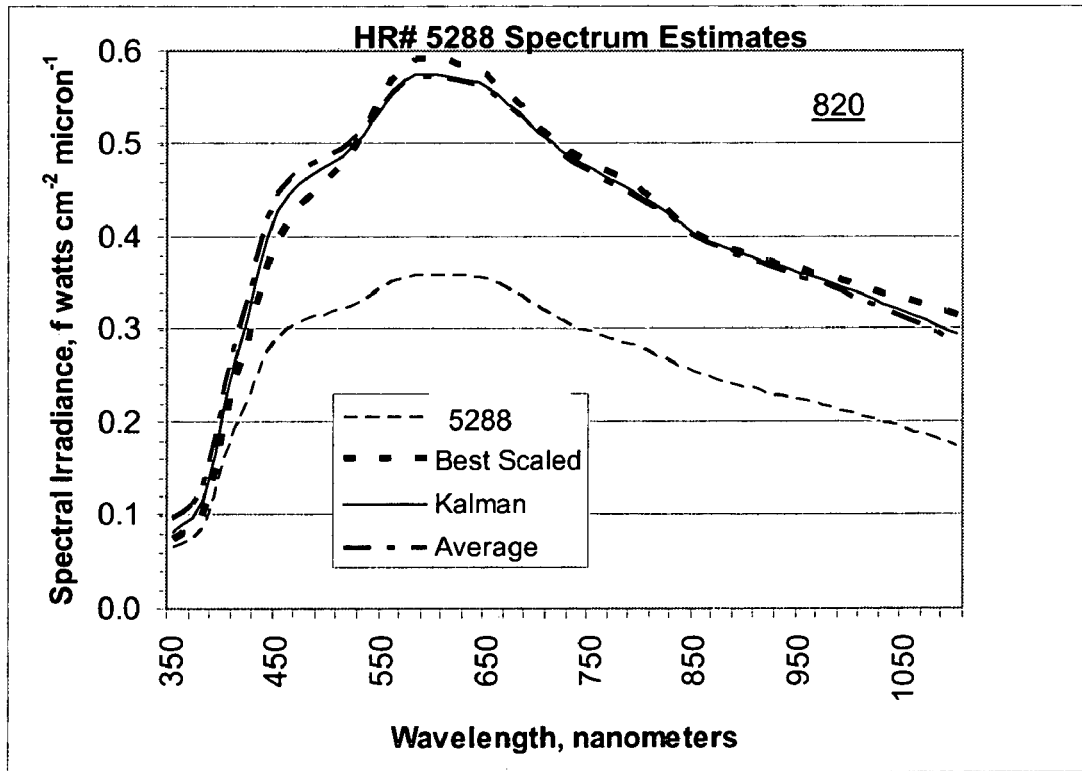
Figure 8D:
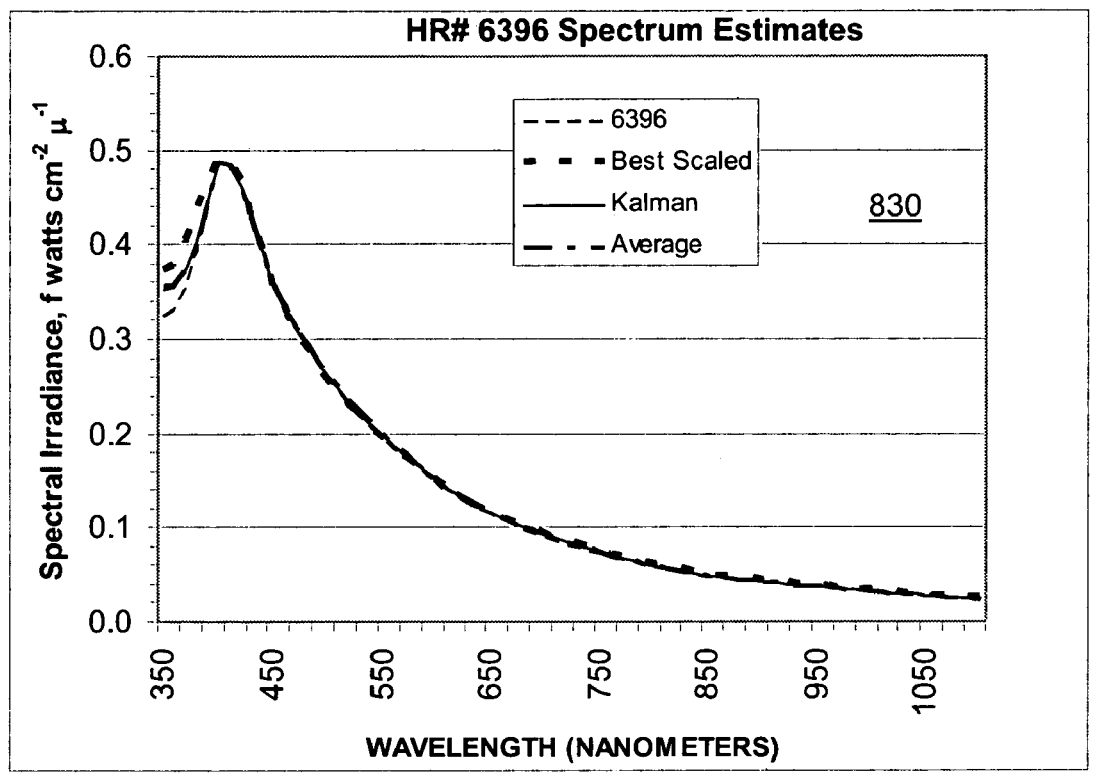
Figure 8E:
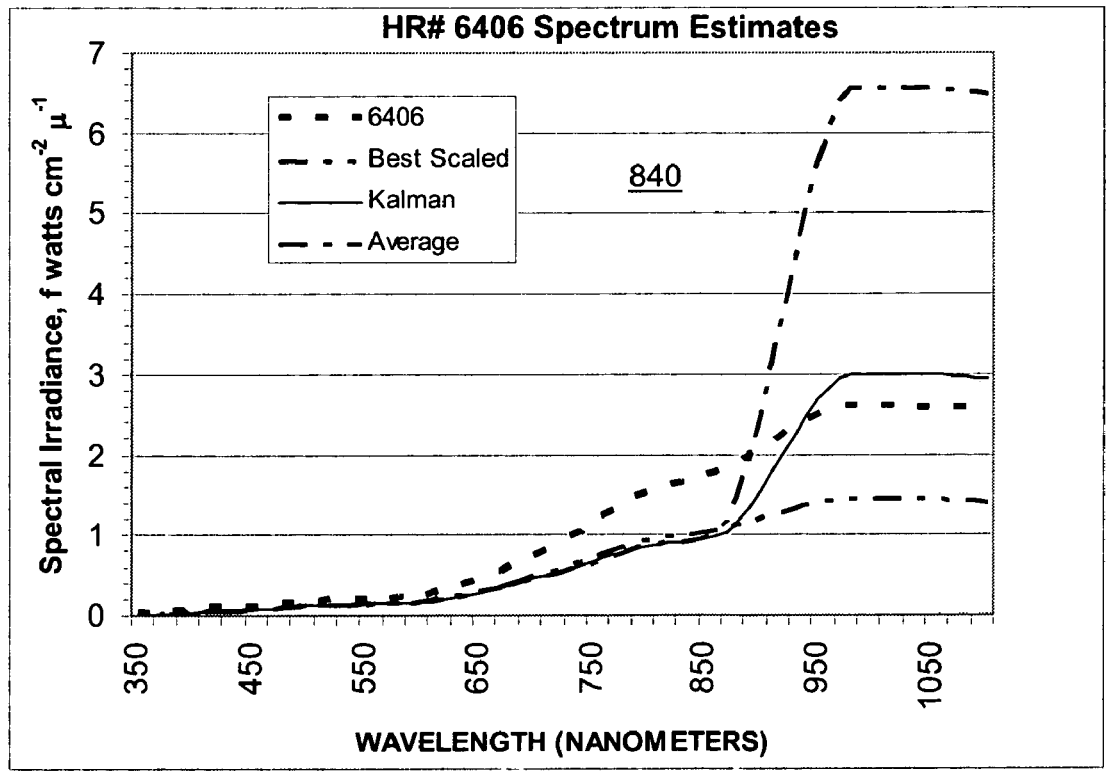

The process can break down under conditions in which the star's spectrum mainly lies outside the bands covered by the broad-band magnitudes. FIGS. 8A through 8F illustrate graphs of spectrum estimates for several stars in the catalogs with problematical characteristics:

FIG. 8A shows HR# 1152 Spectrum Estimates as graph 800;

FIG. 8B shows HR# 2748 Spectrum Estimates as graph 810;

FIG. 8C shows HR# 5288 Spectrum Estimates as graph 820;

FIG. 8D shows HR# 6396 Spectrum Estimates as graph 840;

FIG. 8E shows HR# 6406 Spectrum Estimates as graph 850; and

Figure 8F:
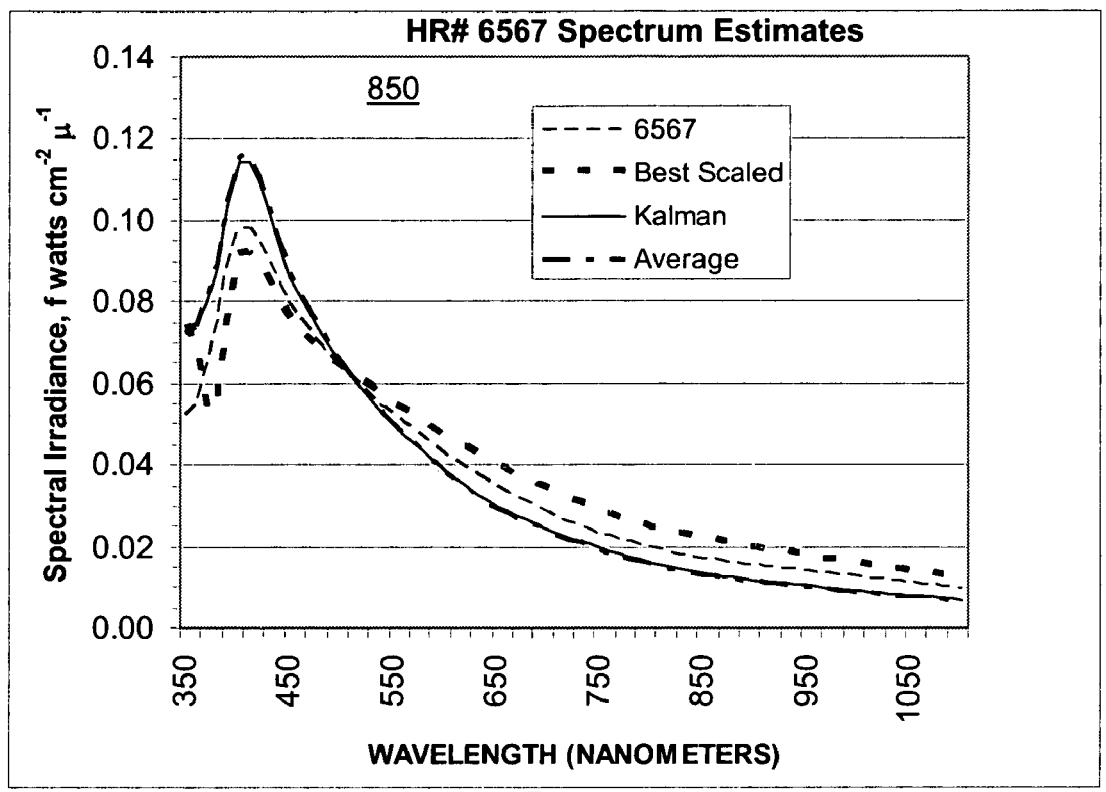

FIG. 8F shows HR# 6567 Spectrum Estimates as graph 860.

FIG. 8B, for example, shows the plot 810 for the very red MJ star HR# 2748, with most of its spectral power beyond the three broad-band magnitudes by about an order-of-magnitude. The expected error in this star is calculated to be very small. This is not due to the quality of the spectrum estimate, but because very little power radiates in those three color bands. Obviously, the described process does not estimate these very red stars as well as the others. The Spectra for another red star HR# 6406 in the graph 840 of FIG. 8E shows example of high spectral power at infrared wavelengths. In this example, the other color magnitudes (also high power) are a about factor of three or four lower than infrared maximum. By including broad-band color magnitudes other than B, V and I, the method could be extended to cover stars outside of the current wavelength limitations. For example, if the J magnitude is added to this methodology, the estimate the spectrum for HR# 2748 improves markedly.

The Spectra for HR# 1152 in the graph 800 of FIG. 8A shows divergence in the blue portion of the spectrum (<400 nm), particularly in the best-scaled values. The Spectra for HR# 5288 in the graph 820 of FIG. 8C shows values about three-fifths in magnitude of the analysis peak (at ~600 nm). These anomalies are discussed subsequently. The Spectra for HR# 6396 in the graph 830 of FIG. 8D shows characteristics similar to those for HR# 1152 in the graph 800. The Spectra for HR# 6567 in the graph 850 of FIG. 8F shows similar trends with higher variation associated with low power peaks.

Composite Estimation of two non-MJ stars: One advantageous feature of the best-scaled estimate is employability of the entire MJ catalog as the collected set. The catalog-best-scaled estimate has an associated spectral type designated by MJ. For a HIP spectral type not yielding good results (i.e., an expected error exceeding 3%), then a new set of MJ spectra can be collected with this MJ catalog-best-scaled spectral type. The method described above can then be performed again. The spectrum from the two suites of estimations that have the least expected error (based on differencing with HIP broad-band color data) can be selected. For example, for the star HIP# 42913, the MJ catalog-best-scaled spectral type and HIP catalogs agree. In this example, the two suites of estimates are identical.

Figure 9A:
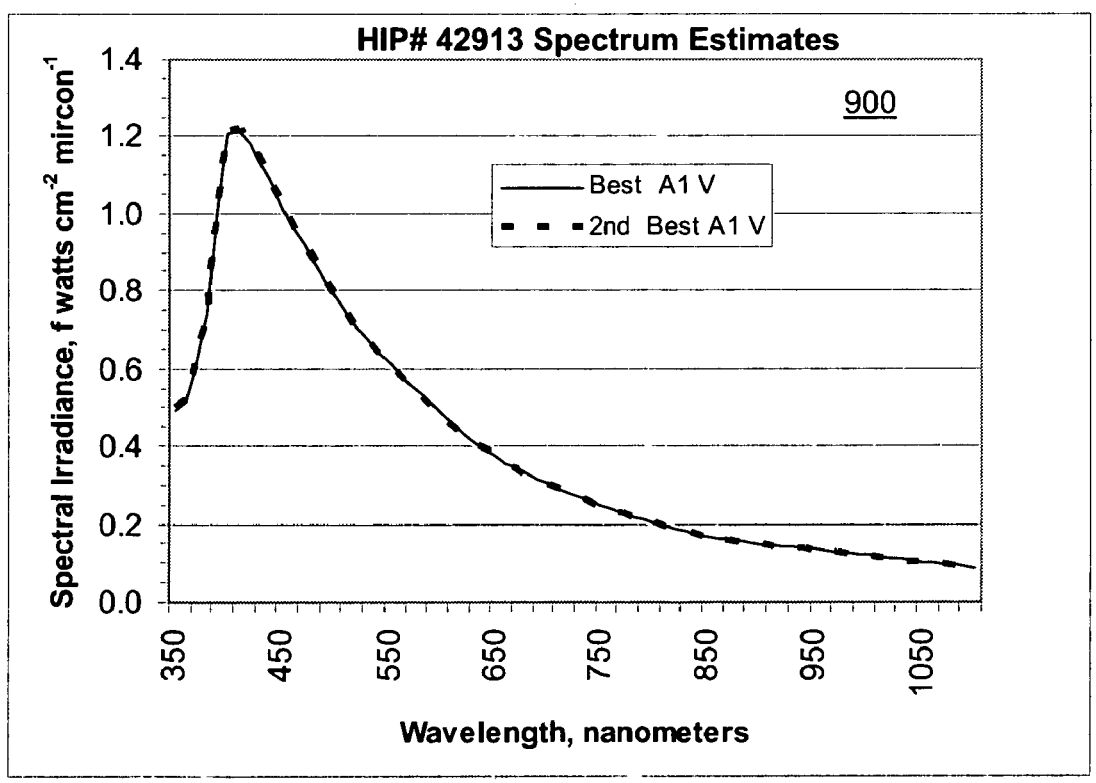
FIGS. 9A and 9B are graphical views of Spectrum Estimates for HIP# 42913 and 49640.
Figure 9B:
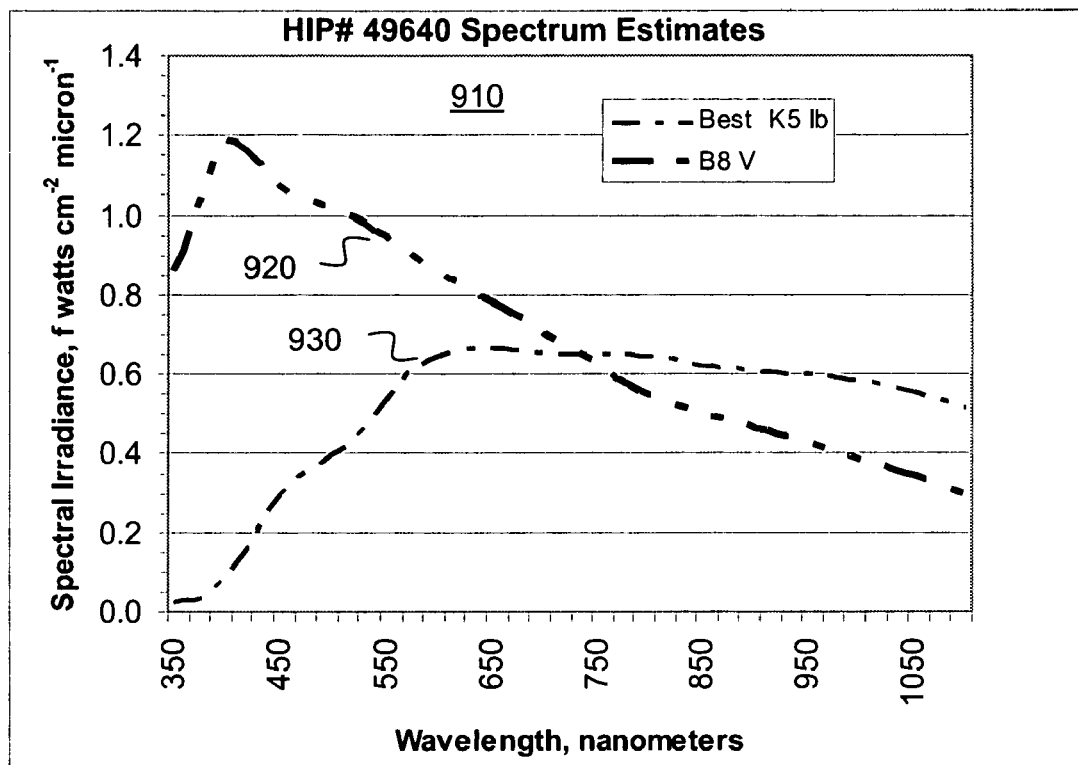

FIG. 9A shows a graph 900 for the Spectrum with the least expected error for this non-MJ star designated HIP# 42913. The abscissa and ordinate again respectively correspond to wavelength and spectral irradiance. For star HIP# 49640, the HIP spectral class is B8 V. The MJ catalog best-scaled analysis selects a spectral class of K5 Ib. Both best and second best values are virtually identical. The spectrum estimates from using a set of B8 V provides an expected error hovering around 25%. However, the K5 Ib set includes a Kalman estimate having an expected error less than 1%. FIG. 9B shows a graph 910 that contrasts the two different solutions: curve 920 based on the MJ class K5 Ib and curve 930 the HIP class B8 V. The MJ-based solution is preferred as the estimated spectrum for this non-MJ star.

In the two examples shown in FIGS. 9A and 9B, the luminosity specification and the spectral class of K5 Ib are included. If MJ has spectral types and luminosity that match the HIP designation exactly, as shown in graph 900, then better Kalman estimates can often be established with this set over the larger set of spectra that matches only on spectral type. On the other hand, sometimes the MJ catalog does not have a star that matches the two-letter HIP spectral designation exactly. In these cases, estimates based on matching only the first letter of the spectral type are made. The overall strategy includes automating the algorithm to provide a composite of estimates and then selecting the value with the lowest expected error as the "composite" estimate.

MJ and HIP Spectral Comparisons: The composite method can be performed on the set of HIP stars also contained in the MJ catalog. The difference between spectra that have been estimated with HIP broad-band photometry and their MJ reference counterparts should be no greater than the "algorithm" error. Table 3 in FIG. 7 shows that the algorithm error is expected to be about 3% without the problematic stars.

Stars that have percent flux differences, calculated by eqn (25) greater than 3% are expected to be due to broad-band differences between MJ and HIP, as shown in FIG. 5G. For a sample of 1205 stars, the average root-mean-square (RMS) difference defined by eqn (25) between the using the composite estimates (using HIP broad-band photometry) and the MJ spectra is 9%. Again, most of the difference lies not with the method, but with the fact that the two catalogs differ in their broad-band colors. If seven suspect MJ stars were removed from the sample, the remaining 1205 stars would give average RMS differences of 4%.

Validation effort these seven suspect MJ stars included consultation with Dr. Benjamin Lane of Charles Stark Draper Laboratory, Cambridge, Mass., provided. These MJ spectra also did not correlate especially well to other more sophisticated estimation techniques. In particular, this method of spectrum estimation was applied to star HR# 5288. Further estimates agreed with Dr. Lane's observation that the MJ spectrum appears suspect, as shown in the graph 820 of FIG. 8C. The MJ spectrum indicates only about half the power as the other estimates. The HIP provided color magnitudes are B=3.071, V=2.06 and I=1.05. The MJ broad-band counter parts were calculated to be somewhat dimmer with magnitudes B=3.588, V=2.58 and I=1.55. For this star, estimates were applied for the spectrum, but not MJ, for CCD sensitivity analysis.

The star HR# 2735 provides another example, revealing a signifycant difference between MJ spectrum and the method's estimate. For this star, Dr. Lane concluded that the MJ catalog probably is mislabeled and the MJ spectrum really belongs to star HR# 2736. Thus, when two catalogs are available, the disclosed method can also quickly illuminate photometric inconsistencies. These inconsistencies can be investigated off-line, and the spectrum that remains valid under scrutiny can be used for missile navigation.

Figure 10:
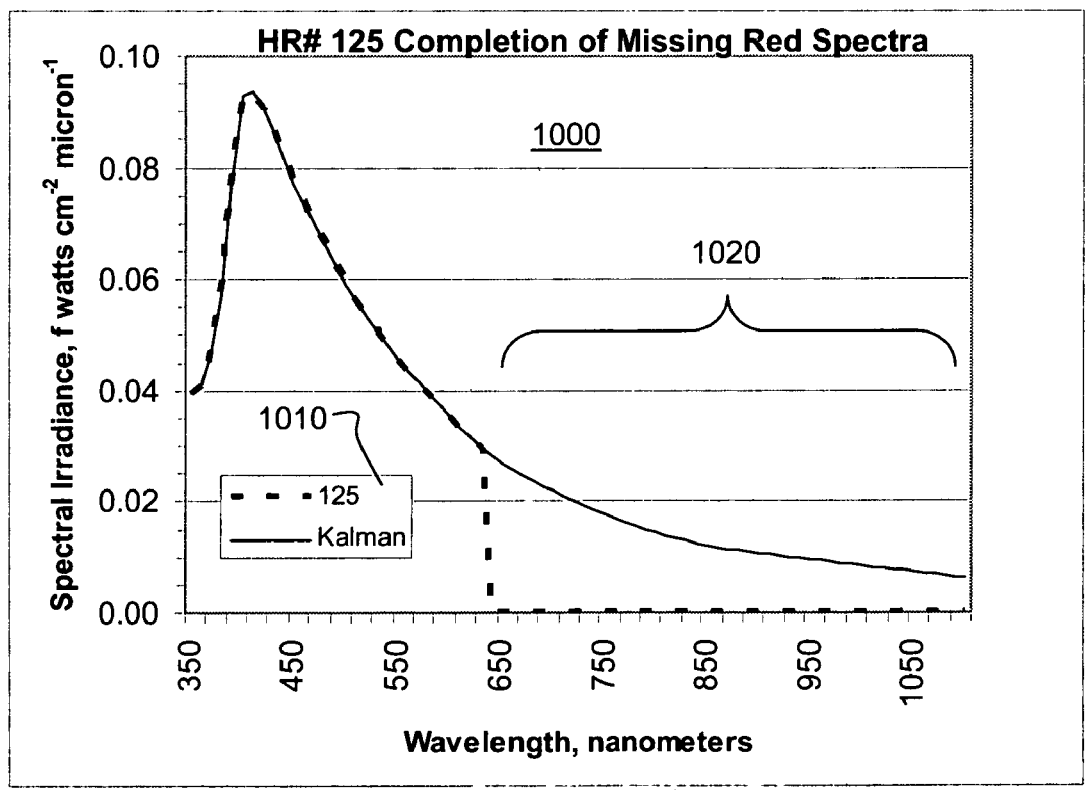
FIG. 10 is a graphical view of Completion of Missing Red Spectra for HR# 125.

Filling-in Missing Spectra: Of the 1380 bright stars in MJ, 163 of them lack red data. By adding the partial spectrum to the set and assigning error as a function of wavelength, the Weighing Algorithm can fill-in the missing data. For example, FIG. 10 shows a graph 1000 for the Spectrum for HR# 125. A legend 1010 identifies a bold dash line that denotes MJ catalog data and a thin solid line to indicate the completed spectrum from weighting application. A bracket 1020 marks the wavelengths above 650 nm beyond which the MJ data are missing and can be compensated for by the process.

For the wavelength bins 670-1100 nm in the HR# 125 example, the spectrum $h_{no\_red}(\lambda_n > 670 \text{ nm})$ is zero. In this red region the input spectrum's error can be defined as an arbitrarily very large number (when compared to typical flux errors):

$$\epsilon_{no\_re}(\lambda_n > 670 \text{ nm}) = 10^{10}. \quad (26)$$

This filling-in option may involve supplying the partial MJ spectrum as well as the associated error. For this example, the broad-band flux error can be supplied by the operator as zero for wavelength bins below or at 670 nm. This method enables these 163 MJ partial spectra to be reclaimed by operating on filled-in data consistent with their spectral class. Thus, the 163 red-less MJ stars need not be treated as purely non-MJ stars.

The methodology described herein estimates the narrow-band spectra of stars not contained in the MJ catalog. For each estimated spectrum, an expected broad-band flux error is calculated. The flux errors are used to select the best-scaled estimate and are used as weights in a Kalman type estimate. Ultimately, a composite estimate is automatically produced when the HIP spectral type designation is suspect.

The method has been validated by treating MJ stars as targets of estimation and then comparing them to the MJ reference spectra counterparts. This method has been shown to detect and highlight photometric differences between the MJ and HIP catalogs, as well as fill-in missing red data for 163 spectra in the MJ catalog. The process has been implemented as an automated set of instructions and within minutes has evaluated more over a hundred-thousand HIP stars for possible inclusion in the weapon system's star catalog for navigation. Furthermore, the method quickly detects photometric violations that neighboring HIP stars may impose on a star for consideration in the weapon system's catalog.

Spectral Estimation: The procedures for the automation process can be described in the following portion, associated with appropriate flowcharts. For an operator having only broad-band information (or at best parts of a narrow-band spectrum: a set of à priori estimates) that characterizes the photometry of a target star, NBSE is used to estimate the narrow-band spectrum of that star.

The NBSE algorithm uses broad-band photometry for the target star and manipulates the information provided in a user-supplied library of narrow-band spectra. The product of these manipulations is an estimate of the narrow-band spectrum for comparison with the received CCD measurements. The process can function as a subroutine in a computer program so that the operator can execute with the necessary inputs and outputs communicated by data arrays. The following high level description of NBSE does not employ arrays, but rather serves as an introduction to the information flow of the algorithm. A detailed procedural description follows.

User Inputs include the list of items under Input "I" as follows:
I(0) various array limits and unit definitions;
I(1) target star's broad-band color magnitudes;
I(2) reference star's broad-band color magnitudes and associated spectrum;
I(3) color transmission curves associated with the broad-band color magnitudes;
I(4) library set of spectra and associated spectra types—associated errors are to be included in response to the set having à priori estimates of the target's star spectrum; and
I(5) user selection of technique to produce the final "weighted" estimate.

NBSE Methods involve the steps "M" as follows:
M(1) compute the reference and target star's broad-band flux given I(1), I(2) and I(3);
M(2) compute the scaled estimates for the target star's spectrum (and associated error) based on the library set I(4)—error estimates for each of the scaled estimated spectra are also computed;
M(3) identify the scaled spectrum that has the least broad-band flux error from M(2)—identify this spectrum's spectral type provided by I(4);
M(4) determine the error weights to be used in the weighting estimation based on M(2) and I(5);
M(5) compute the weighting spectrum estimation and Kalman error; and
M(6) compute the flux error in the weighting estimate.

Algorithm Output involve the steps "O" as follows:
O(1) set of scaled estimates for the target star's spectrum;
O(2) set of errors associated with each of the scaled spectrum;
O(3) array of flux errors used in the weighting estimation;
O(4) the array index number for the set O(1) that has the lowest scaled flux error;
O(5) the spectral type associated with the scaled-spectrum with least flux error;
O(6) the weighted estimation of the target star's spectrum and Kalman error; and
O(7) the weighted error for the weighted estimation.

NBSE Detailed Description: This detailed description includes arrays and computations and is done in two parts. Part A describes how data arrays are organized in the algorithmic procedure. Some of these arrays serve as the mechanism of input and output to and from the procedure. Other data arrays describe the algorithm communication of information from one step of the algorithm to another. Part A is somewhat involved, so some simple examples are provided. The benefit in separating the array description from the method is that the former can be succinctly given. Part B describes the algorithm in a manner that can be easily transcribed into a computer program subroutine.

Part A—Array Definitions: This section describes the arrays used by NSBE. A simple example is given that traces the flow of the algorithm's methods given in Part B.

Section A-0 Array Indices: The algorithm uses many arrays of data. One-dimensional arrays are indexed by one variable. Two-dimensional arrays are indexed by two variables. These variables include color k, wavelength bin λ and spectrum identification mj.

A-0(i): The integer k is an index of color that ranges from 1 to $k_{max}$. The color refers the color broad-band of the light spectrum. The association between color and k depends on the transmission curves that the user supplies. For example, k=1 could indicate blue; k=2 visual and $k_{max}$=3 infrared.

A-0(ii): The index integer λ indicates the wavelength bin associated with the spectra and ranges from 1 to $\lambda_{max}$. For this example, λ=1 indicates the wavelength bin range from 350 nm to 360 nm. The next bin λ=2 indicates a bin ranging from 360 nm to 370 nm. The subsequent bins follow this pattern until $\lambda_{max}$=76 in this example, representing the bin ranging from 1090 nm to 1100 nm. The operator supplies a wavelength bin size Δλ that allows the algorithm to properly interpret the value of the wavelength bin. This example has a bin size Δλ of 10 nm.

A-0(iii): The integer mj is an index of spectrum identification for user supplied spectra. The index mj ranges from 1 to $mj_{max}$ for a library of narrow-band spectra that is not associated with the target star. The index mj ranges from $mj_{max+1}$ to $mj_{max}+mj_{\_add}$ for à priori estimations of the target star's spectrum.

The operator provides the maximum value for these three array indices: $k_{max}$, $\lambda_{max}$ and $mj_{max}$. The operator also supplies $mj_{\_add}$ whose value is the number of à priori estimates that the operator includes in the library set of spectra. These à priori estimates are included in the set after the "regular" spectra.

Section A-1 Color Magnitudes: The target star's and reference star's broad-band color magnitudes are supplied by the user and each can be represented by a one-dimensional array colormag(k) and color0(k), respectively. For example, let the Harvard Revised numbered star HR# 1142 be the target star. For this star, the Hipparcos Star Catalog estimates the blue, visual and infrared magnitudes as 3.62, 3.72 and 3.81 respectively. Furthermore, Alpha-Lyrae can be used as the reference star and its blue, visual and infrared magnitudes are all the same value 0.03. The operator supplies the NBSE the color array's as:

colormag(1)=3.62;
colormag(2)=3.72;
colormag(3)=3.81; and
color0(I)=color0(2)=color0(3)=0.03, as user-supplied inputs.

Section A-2 Transmission Curves: The user of the algorithm must supply the transmission color curves associated with the supplied color magnitudes. The transmission curves are represented by the two-dimensional array color that has the wave bin number λ as the first index and the color k as the second index. FIG. 2 shows the plot 200 as an example of the blue b(λ), visual v(λ), and infrared i(λ) transmission that the operator may employ.

In this example, the operator inputs a wavelength bin size Δλ of 10 nm to the algorithm. The operator can extrapolate or fill-in the color array such that for λ=1 associates with transmission values denoted by 350 nm; λ=2 with 360 nm, ..., λ=76 with 1100 nm. In this example, $\lambda_{max}$=76 and $k_{max}$ is three. For the example given in section A-1, the operator could populate the array as:

$$\left.\begin{array}{l}\text{color}(\lambda, 1) = b(\lambda) \\ \text{color}(\lambda, 2) = v(\lambda) \\ \text{color}(\lambda, 3) = i(\lambda)\end{array}\right\} \text{ for } \lambda = 1, \lambda_{max}, \quad (27)$$

where k=1, 2 and 3 are respectively associated with blue, visual and infrared wavelength bands.

Figure 11:
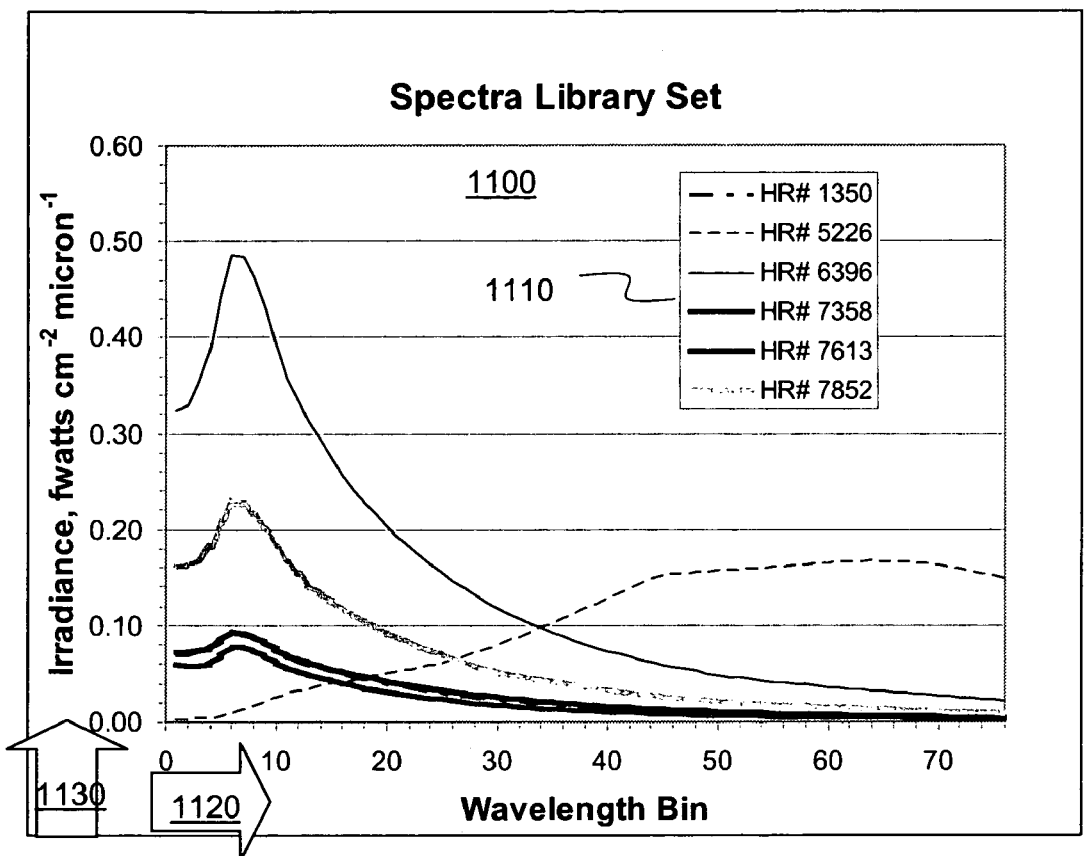
FIG. 11 is a graphical view of a Spectra Library Set.

Section A-3 Library of Narrow-band Spectra: The operator supplies the algorithm a set of narrow-band spectra by means of a two-dimensional array $h_{mj}(\lambda_n)$ has wave bin number λ as the first index and spectrum number mj as the second index. FIG. 11 shows a plot 1100 an example of spectra for a library of six stars identified in a legend 1110. The abscissa 1120 corresponds to wave bin number, and the ordinate 1130 represents spectral irradiance.

These six stars are identified in the legend 1110 with Harvard Revised Numbers. Of these, HR# 1350, HR# 6396, HR# 7358, HR# 7613 and HR# 7358, which are similar and are designated as spectral type B6 III. The odd spectrum in the set is HR# 5226 (the second, with thin dash line), which has an M3 spectral type. This simple example lacks à priori spectra estimates of the target star HR# 1142.

An example of a set of spectra could correspond to the following relations:

$h_1(\lambda)$ being spectrum for HR# 1350;
$h_2(\lambda)$ being spectrum for HR# 5226;
$h_3(\lambda)$ being spectrum for HR# 6396;
$h_4(\lambda)$ being spectrum for HR# 7358;
$h_5(\lambda)$ being spectrum for HR# 7613; and
$h_6(\lambda)$ being spectrum for HR# 7852, such that λ=1, $\lambda_{max}$.

For this example, $\lambda_{max}$ is seventy-six and the wavelength bin λ corresponds to the wavelength bins associated with the color array defined in section A-1. In this example, $mj_{max}$ is six. The reference spectrum is a single dimensional array denoted as $h_0(\lambda)$. The reference spectrum is usually Apha-Lyrae, HR# 7001. The spectral type associated with each spectrum $h_{mj}(\lambda_n)$ is stored in the one-dimensional array spectral_type$_{mj}$. In example shown above, spectral_type$_{mj}$ is "B6 III" where mj=1, 3-6. For the second spectrum, mj=2, spectral_type$_2$ is "M3".

Section A-4 Broad-Band Flux Estimations: The algorithm produces broad-band flux estimates for the reference, target and the entire library of user supplied spectra. The reference and target broad-band flux are separated into color regions and are represented as single-dimensioned arrays $I_0(k)$ and $I_T(k)$, respectively. The broad-band flux associated with the library of input narrow-band spectra is represented as a two-dimensional array $I_{mj}(k)$ where mj is the spectrum index.

Section A-5 Scales and Scaled Narrow-Band Spectra: The algorithm produces a scale for each color region k for each spectrum in the library set for mj=1, $mj_{max}$ (absent any scaling of à priori estimates). These color scales are represented by a two-dimensional array $\alpha_{mj}(k)$. The k color scales are used to produce a single least-squares scale denoted by the one-dimensional scale array $S_{mj}$. The algorithm uses this single scale array $S_{mj}$ to scale the library of spectra $h_{mj}(\lambda)$ to produce a family of estimates for the target star's narrow-band spectrum $\hat{h}_{mj}(\lambda)$.

A least-squares approach is used to calculate this scale array $S_{mj}$. The scale $S_{mj}$ is chosen to minimize the error in flux δ(k) for each color region, such that:

$$\delta(k)=[S_{mj}-\alpha_{mj}(k)]I_{mj}(k) \quad (28)$$

where $I_{mj}(k)$ is the broad-band flux. The region errors are independent such that the total square of the flux error, over the sum of all k, can be expressed as:

$$\delta^2_{mj} = \sum_{k=1}^{k_{max}} \delta^2(k). \quad (29)$$

Moreover, the total flux error can be minimized with respect to scale $S_{mj}$ as:

$$S_{mj} = \frac{\sum_{k=1}^{k_{max}} \alpha_{mj}(k)[I_{mj}(k)]^2}{\sum_{k=1}^{k_{max}} [I_{mj}(k)]^2}. \quad (30)$$

Figure 12:
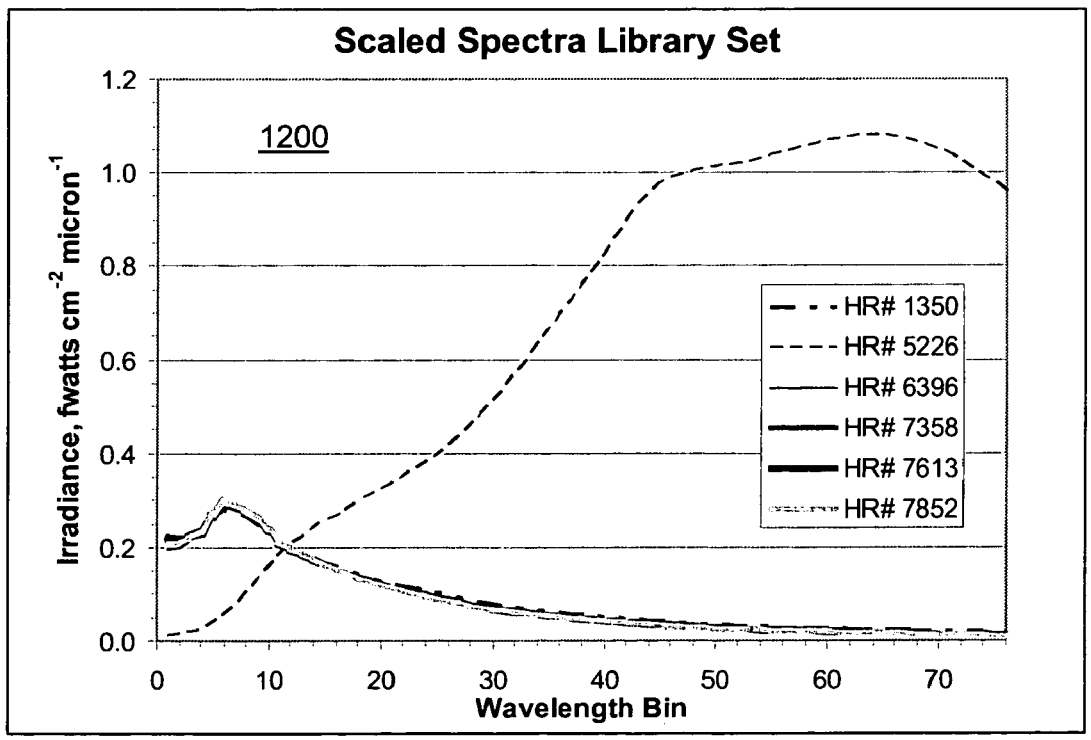
FIG. 12 is a graphical view of a Scaled Spectra Library Set.

The library set of spectra in the library set can be scaled to provide estimates for the target star's spectrum. FIG. 12 shows a plot 1200 for an example of scaled-spectra associated with the six-star library set shown in the graph 1100 of FIG. 11 for Scaled Spectrum Estimates for HR# 1142. All the B6 III stars line up almost congruently, where as the M3 spectrum from HR# 5226 deviates greatly from the others.

Section A-6 Scaled Spectra Error Estimates: The algorithm calculates a broad-band color flux error $\Delta\hat{I}_{mj}(k)$ associated with the scaled spectra $\hat{h}_{mj}(\lambda)$. The flux error is computed for mj=1,mj$_{max}$. The à priori spectra estimates are not scaled and already have errors provided via operator-input. Based on this flux error, the algorithm also computes a wavelength-independent error for each spectrum stored in the single-dimensional array $\Delta\hat{h}_{mj}$.

In the example shown in the graph 1200 of FIG. 12, the broad-band flux errors are summarized in FIG. 13 as a tabular listing 1300 of Table 4 for Scaled Spectral Flux Error. These errors indicate that the M3 star scaled spectrum has an estimated error much greater than the other B6 III scaled spectra. The algorithm selects the HR# 6396 scaled-spectrum as that with least flux error. The algorithm also indicates that B6 III represents the spectral class that best fits the target star's color magnitudes of all the spectra given in the user's library set.

Section A-7 Computing the Weights for the Weight Estimation: The two-dimensional error array $\epsilon_{mj}(\lambda)$ can provide weights to combine the family of scaled-spectra $\hat{h}_{mj}$ into a single spectrum estimate $\hat{h}_W(\lambda)$. The operator can choose one of three methods to create these weights. The first method (A-7.1) merely averages all the scaled spectra. In this example, $\epsilon_{mj}(\lambda)$ represents a simplified set to the value of unity for all scaled spectra in the set for all wavelengths. The second method (A-7.2) weighs each scaled spectrum with its associated computed flux error $\Delta\hat{h}_{mj}$. The third method (A-7.3) linearly combines the color flux error $\Delta\hat{I}_{mj}(k)$ as weighted by the user provided color weight cw($\lambda$,k). The third method computes weights as a function of wavelength.

For illustrative purposes, the algorithm calculates the broad-band flux errors according to the color curves given in the example of Section A-2. Furthermore, the scaled spectra can be set as $\hat{h}_1(\lambda)$ and $\hat{h}_2(\lambda)$, respectively to have blue, visual and infrared broad brand flux errors as:

$$\left.\begin{array}{ll}\Delta\hat{I}_1(1) = 0.0 & \Delta\hat{I}_2(1) = 1.0 \\ \Delta\hat{I}_1(2) = 1.0 \text{ and } & \Delta\hat{I}_2(2) = 1.0 \\ \Delta\hat{I}_1(3) = 1.0 & \Delta\hat{I}_2(3) = 1.0.\end{array}\right\} \text{(method } A-7.1) \quad (31)$$

An exemplary operator input to the algorithm is weight_option. For weight_option being set to one, then $\epsilon_{mj}(\lambda)$ sets to 1 for all spectra mj and wavelength bins $\lambda$. This option merely averages the spectra in each wavelength bin. For weight_option being set to two, then $\epsilon_{mj}(\lambda)$ is $\Delta\hat{h}_{mj}$, which represents the flux error for all wavelength bins in the scaled spectrum. For weight_option being set to three, then $\epsilon_{mj}(\lambda)$ is defined per wavelength bin.

This third option uses cw($\lambda$,k) to define how to weigh the broad-band error $\Delta\hat{I}_{mj}(k)$ for each color. This feature can be especially useful for spectral regions where wavelength bins are associated with more then one color (as observed from the overlap of the curves for blue and visual spectra in the plot 200 of FIG. 2). FIG. 13 provides a tabular list 1310 in Table 5 showing an example for the construction of $\epsilon_{mj}(\lambda)$ given that weight_option=3 and that the broad-band flux error $\Delta I_{mj}(k)$ is defined by method A-7.1. The wavelength bins follow the example provided in Section A-2.

The tabular listing 1300 in Table 4 shows that the infrared region $\lambda$=[37,76], with the two flux errors being equally weighted $\Delta I_1(3)$ and $\Delta I_2(3)$ to define the error weights in the infrared region for both $\epsilon_1(\lambda)$ and $\epsilon_2(\lambda)$. By contrast, in the mixed region of $\lambda$=[14,22], the blue and visual errors overlap, and thus they are equally weighted. Because $\Delta\hat{I}_1(1)$=0.0, then half as much error is given to $\epsilon_1(\lambda)$ than $\epsilon_2(\lambda)$.

Section A-8 Weighted Spectrum Estimation: Upon completion of the calculation, the algorithm computes a single or "weighted" estimate of the target's spectrum $\hat{h}_W(\lambda)$. The algorithm also calculates a "weighted" error in this estimate $\epsilon_W(\lambda)$. Both $\hat{h}_W(\lambda)$ and $\epsilon_W(\lambda)$ are one-dimensional arrays indexed by the wavelength bin $\lambda$.

A broad-band flux estimate of the weighted spectrum $\hat{h}_W(\lambda)$ can be used to also calculate a broad-band flux error $\Delta I_W(k)$ that represents a one-dimensional array indexed by color k. This broad-band flux error can be employed to create a scalar estimate of the total spectrum error $\Delta\hat{h}_W$.

FIG. 14 shows a plot 1400 with the weighted spectrum for each of the three weighting options discussed Section A-7 for HR# 1142. The abscissa and ordinate correspond to the parameters described for graphs 1000 and 1100. An estimate that is derived from the MJ catalog is shown for comparison. The "average" spectrum computed by the first option does not match the MJ spectrum, whereas the two weighted options compare favorably. The "average" scaled-spectrum works adequately for conditions in which the library set contains spectra similar to the target star. The "weighted" options have the ability to filter or weed-out the harmful spectra from the library set in estimating the target star's spectra.

As described earlier, the operator can supply à priori estimates of the target stars spectra. These à priori estimates are accompanied by an error estimate per wavelength bin to be included in the set after the "regular" spectra as described in A-0 (iii) so that the algorithm assigns the associated operator-supplied errors correctly. This feature of the algorithm enables filling-in missing data in a spectrum.

By adding the partial spectrum to the library set and assigning error as a function of wavelength, NBSE can supplement the missing data, thereby enabling a greater number of stars to be made available for navigation. For example, FIG. 10 shows plot 1000 of HR# 125 without red data in the catalog, yet the "weighted" or Kalman estimate from NBSE shows the spectrum filled-in for complete extrapolation. In this example, the broad-band flux error is set to zero for wavelength bins between 670 nm and 1100 nm, the corresponding spectrum is also defined as zero by $h_{mjmax+1} = h_{no\_red}(\lambda > 670 \text{ nm}) = 0$ and the corresponding error $\epsilon_{mjmax+1} \equiv \epsilon_{no\_red}(\lambda > 670 \text{ nm}) = 10^{10}$ from eqn (26).

The operator inserts partial spectra into the algorithm by merely adding it to the library of user supplied spectra $h_{mj}(\lambda)$. The algorithm prompts the operator to input a variable $mj_{max}$ and mj_add. In the spectra array $h_{mj}(\lambda)$, the indices mj=1 to mj$_{max}$ refers to narrow band spectra not associated with the target star. The indices mj=$mj_{max+1}$ to mj_add refers to the à priori spectra of the target star. The associated à priori flux error is supplied by the user by means of the two-dimensional array add_err$_{mj}(\lambda)$.

Part B. Narrow-Band Spectra Estimation Method: The following method for NBSE relies on using a library set of pre-defined narrow-band spectra. Spectra from the library are characterized by a spectral type. The operator constructs a library of narrow-band spectra that usually may, but need not, be consistent with the target star's spectral type. The algorithm coarse-grains the spectra in this library and then scales them to match the target star's broad-band photometry.

These scaled narrow-band spectra provide a number of estimates of the target star's narrow-band spectrum. The scaled spectrum that has the least flux error is identified along with its associated spectral type. Each scaled estimate is associated with an expected error. The algorithm uses these scaled spectra and errors (and any à priori estimates) to calculate a single Kalman-type (or weighted) estimate of the target star's spectrum. Based on the array descriptions given in the Part A, the method for estimating narrow-band spectra is described below.

Section B-0 NSBE Input/Output: FIG. 15 lists the parameters of user input to be supplied by the operator, as well as of output. User definitions and options are presented in a first block 1500 to identify parameters such as number of spectra, wavelength bin width and weight options. Arrays of photometry data are presented in a second block 1510 to identify color magnitude and library information. Algorithm output is presented in a third block 1520 to identify scaled estimates and errors.

Section B-1 Compute the reference and target star's broad-band flux: FIG. 16A identifies a first do-loop 1600 for setting the broad-band flux arrays $I_0$ and $I_T$ for each color k. These arrays correspond to eqns (2) and (3) in discretized form, expressed as eqns (32) and (33):

$$I_0(k) = \text{units}_0 \sum_{\lambda=1}^{\lambda max} \text{color}(\lambda, k) h_0(\lambda) \Delta \lambda \quad (32)$$

$$I_T(k) = I_0(k) \times 10^{0.4(color0(k)-colormag(k))}, \quad (33)$$

where $I_0$ represents the reference flux and $I_T$ represents the target star's flux. The notation indicates that the function product color$(\lambda,k)h_0(\lambda)$ is defined for each wavelength bin between $\lambda=1$ to $\lambda_{max}$ and is numerically integrated within those limits. The scalar units$_0$ defines the units of the resultant color flux.

Section B-2 Compute the scaled narrow-band estimates and flux errors for the target star: FIG. 16B illustrates a second do-loop 1610 that nests additional steps for mj from unity to $mj_{max}$ to perform several further operations. These include:

first, as do-loop 1612, computing of the color broad-band flux and color scales for each narrow-band spectrum based on eqns (34) and (35):

$$I_{mj}(k) = \text{units}_{mj} \sum_{\lambda=1}^{\lambda max} \text{color}(\lambda, k) h_{mj}(\lambda) \Delta \lambda \quad (34)$$

$$\alpha_{mj}(k) = 0.0 \text{ initially, if } (I_{mj}(k) > 0.0) \text{ then } \alpha_{mj}(k) = I_T(k)/I_{mj}(k), \quad (35)$$

where $\alpha_{mj}(k)$ represents the target flux normalized to the MJ spectra.

second, as calculation 1614, producing a single least-squares scale for each narrow-band spectrum from the color scales as in eqn (30);

third, as do-loop 1616, scaling the narrow-band spectra to estimate scaled-spectrum for the target star as in eqn (10); and fourth, as do-loop 1618, scaling the narrow-band spectra to estimate scaled-spectrum for the target star to yield error $\Delta \hat{h}_{mj}(\lambda)$ from the root-sum-square (RMS) of the difference between the broad-band flux arrays $\hat{I}_{mj}(k)$ to match $I_T(k)$ as expressed in eqns (36) and (37):

$$\hat{I}_{mj}(k) = \text{units}_{EST} \sum_{\lambda=1}^{\lambda max} \text{color}(\lambda, k) \hat{h}_{mj}(\lambda) \Delta \lambda \quad (36)$$

$$\Delta \hat{I}_{mj}(k) = sqrt\left(\left(\hat{I}_{mj}(k) - I_T(k)\right)^2\right), \quad (37)$$

where $\hat{I}_{mj}(k)$ represents the scaled broad-band flux estimate. The do-loop 1610 continues to solve in eqn (38):

$$\Delta \hat{h}_{mj} = sqrt\left(\sum_{k=1}^{kmax} \Delta \hat{I}_{mj}(k)\right), \quad (38)$$

where $\Delta \hat{h}_{mj}(\lambda)$ represents the error result for the sum of the flux estimates over all the colors. This operational section terminates upon completion of this calculation.

Section B-3 Identify the scaled spectrum that has the least broad-band flux error: The spectral type of the target star under observation can be compared to the catalog and identified. FIG. 16C illustrates a series of operations 1620. These include setting a default spectral type, followed by a do-loop that nests additional steps for mj from two to $mj_{max}$ to compare the current minimum error to that of alternate spectral types.

Section B-4 Determine the Error Weights to be used in the Weighing Equation: FIG. 16D illustrates a series of operations 1630 with nested do-loops as described in Section A-7. Color error can set all the scaled spectra as $\epsilon_{mj}(\lambda)=1$ for the first selection. Each scaled spectrum can be weighted with its associated computed flux error $\Delta \hat{h}_{mj}$ for the second selection. The weights can be computed as a function of wavelength as a root-mean-square product of color flux error $\Delta \hat{I}_{mj}(k)$ weighted by the user-provided color weight cw$(\lambda,k)$.

Section B-5 Weighting Estimation: FIG. 16E illustrates a series of operations 1640 with concatenated do-loops as described for iterative update operations. These include:

first, as nested double do-loop 1642 for both wavelength bin and further by spectral type mj, adding to the scaled spectrum set any à priori spectra and associated error in eqns (39) and (40):

$$\epsilon_{mj}(\lambda_i) = \text{add\_err}_{mj}(i) \quad (39)$$

$$\hat{h}_{mj}(\lambda) = h_{mj}(\lambda) \text{units}_{mj}, \quad (40)$$

where $\epsilon_{mj}(\lambda_i)$ represents weighting factor and $\Delta \hat{h}_{mj}(\lambda)$ represents the computed flux error from spectral flux differencing.

second, as initialization 1644 incremented for each wavelength bin, correcting the spectrum by eqn (13) for the first mj spectrum;

third, as do-loop 1646 incremented for each wavelength bin correcting the spectrum by eqns (14) through (16) for the second through last mj spectrum; and fourth, after the spectra loop terminates, weighting operation 1648 determines the weighted single spectrum estimate $\hat{h}_W(\lambda_n)$ and the weighted error $\epsilon_W(\lambda_n)$ by eqn (17), after which the wavelength loop terminates.

Section B-6 Error in Weighted Estimate: FIG. 16F illustrates a series of color do-loop 1650 to determine weighted flux and associated error in eqns (41) and (42):

$$\hat{I}_W(k) = \text{units}_{EST} \sum_{\lambda=1}^{\lambda max} \text{color}(\lambda, k)\hat{h}_W(\lambda)\Delta\lambda \quad (41)$$

$$\Delta\hat{I}_W(k) = sqrt\left((\hat{I}_W(k) - I_T(k))^2\right) \quad (42)$$

upon completion of which the error difference from the weighted single spectrum estimate can be computed as eqn (43):

$$\Delta\hat{h}_W = sqrt\left(\sum_{k=1}^{ncolor} \Delta\hat{I}_W(k)\right), \quad (43)$$

as a summation of the weighted flux errors over all the colors k.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for characterizing luminous celestial objects in celestial navigation of a missile system, said method comprising:
    segmenting wavelength range into a plurality of discrete contiguous bins;
    assigning each bin of said plurality of bins into a plurality of color bands;
    establishing a transmissivity to said each bin of each color band;
    measuring luminous intensity from a target object for said each bin as a plurality of measured intensities;
    computing broad-based fluxes for a reference value as a reference flux, said target object as a target flux estimate for said each color band, and a narrow-band library as a library flux, wherein said reference and library fluxes include summing a first multiplication of said transmissivity for said each bin and a reference luminous intensity for said each bin over said plurality of bins;
    ratioing said target flux to said library flux as a color scale for each said color band;
    squaring said library flux for each said color band as a library flux squared;
    producing a spectral scale by summing over said plurality of color bands a second multiplication of said color scale and said library flux squared as a first sum product, summing over said plurality of color bands said library flux squared as a second sum product and dividing first sum product by said second sum product;
    scaling each measured intensity of said plurality of measured intensities as a scaled intensity by multiplying each said target intensity by said spectral scale for each said bin; and
    determining a scaled broad-band flux for said each color band by summing over said plurality of bins a third multiplication of said transmissivity and said scaled intensity.

2. The method according to claim 1, further comprising:
    subtracting for said color band said target flux estimate from said scaled broad-band flux as a plurality of flux differences;
    summing for said each color band a square of each flux difference of said plurality of flux differences as a sum-square flux difference;
    computing for said each color band a square-root of said sum-square flux difference as a root-sum-square flux difference; and
    determining an intensity error estimate by summing over said plurality of color bands each said root-sum-square flux difference as an intensity error estimate.

3. The method according to claim 1, further comprising:
    subtracting for said color band said target flux estimate from said scaled broad-band flux as a plurality of flux differences;
    summing for said each color band a square of each flux difference of said plurality of flux differences as a sum-square flux difference;
    computing for said each color band a square-root of said sum-square flux difference as a root-sum-square flux difference;
    weighting for each color band said root-sum-square flux difference as a weighted flux difference; and
    determining an intensity error estimate by summing over said plurality of color bands each said weighted flux difference as an intensity error estimate.

4. The method according to claim 1, wherein scaling each target intensity further comprises:
    extrapolating a missing target intensity in said target flux estimate with a Kalman filter estimate.

* * * * *